United States Patent
Ling et al.

(10) Patent No.: US 7,693,231 B2
(45) Date of Patent: Apr. 6, 2010

(54) SYSTEM AND METHOD OF CALCULATING NOISE VARIANCE

(75) Inventors: Fuyun Ling, San Diego, CA (US); Thomas Sun, San Diego, CA (US); Raghuraman Krisnamoorthi, San Diego, CA (US); Durk L. van Veen, Santee, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 11/453,439

(22) Filed: Jun. 14, 2006

(65) Prior Publication Data

US 2007/0263712 A1 Nov. 15, 2007

Related U.S. Application Data

(60) Provisional application No. 60/800,628, filed on May 15, 2006.

(51) Int. Cl.
*H04L 27/00* (2006.01)
(52) U.S. Cl. .......................... 375/295; 375/285
(58) Field of Classification Search ......... 375/227–228, 375/295, 316
See application file for complete search history.

(56) References Cited

U.S. PATENT DOCUMENTS

| | | | |
|---|---|---|---|
| 4,924,229 A * | 5/1990 | Eichel et al. .............. | 342/25 E |
| 6,181,755 B1 * | 1/2001 | Junell ......................... | 375/362 |
| 6,275,523 B1 | 8/2001 | Chen et al. | |
| 6,408,189 B1 * | 6/2002 | Nakamura et al. .......... | 455/504 |
| 6,577,690 B1 * | 6/2003 | Barman et al. .............. | 375/354 |
| 7,064,702 B1 * | 6/2006 | Abatzoglou ............... | 342/25 F |
| 7,313,194 B2 | 12/2007 | Bar-Ness et al. | |
| 2004/0146098 A1 * | 7/2004 | Eliezer et al. ............... | 375/227 |
| 2006/0209979 A1 * | 9/2006 | Sandell et al. .............. | 375/267 |
| 2007/0255495 A1 * | 11/2007 | Alexander .................. | 701/213 |

OTHER PUBLICATIONS

International Search Report—PCT/US07/068641, International Search Authority—European Patent Office—Nov. 14, 2007.
Written Opinion, PCT/US07/068641, International Search Authority, European Patent Office, Nov. 14, 2007.
International Preliminary Report on Patentability, PCT/US07/068641, The International Bureau of WIPO, Geneva, Switzerland, Nov. 17, 2008.

* cited by examiner

*Primary Examiner*—Emmanuel Bayard
(74) *Attorney, Agent, or Firm*—Gerald P. Joyce, III

(57) ABSTRACT

The claimed subject matter relates to estimating noise variance associated with a transmitter. For example, the noise variance can be estimated in connection with determining performance parameters associated with a transmitter. Determining noise variance can include the acts of estimating phase alteration of a received signal through utilization of a least squares-based phase estimation algorithm. Determining noise variance can also include the act of determining an unbiased estimation of noise variance as a function of the estimated phase alteration.

38 Claims, 24 Drawing Sheets

SYSTEM AND METHOD OF CALCULATING NOISE VARIANCE

CROSS-REFERENCE TO RELATED APPLICATION

This application claims the benefit of Provisional application Ser. No. 60/800,628, filed on May 15, 2006, and entitled SYSTEM AND METHOD OF CALCULATING NOISE VARIANCE. The entirety of this application is incorporated herein by reference.

I. FIELD

The following description relates generally to communications systems, and more particularly to testing and monitoring transmitter performance.

II. BACKGROUND

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

Forward Link Only (FLO) technology has been developed by an industry group of wireless communication service providers to utilize the latest advances in system design to achieve the highest-quality performance. FLO technology is intended for a mobile multimedia environment and is suited for use with mobile user devices. FLO technology is designed to achieve high quality reception, both for real-time (streaming) content and other data services. FLO technology can provide robust mobile performance and high capacity without compromising power consumption. In addition, the technology reduces the network cost of delivering multimedia content by decreasing the number of base station transmitters that are necessarily deployed. Furthermore, FLO technology based multimedia multicasting is complimentary to wireless operators' cellular network data and voice services, as cellular network data can be delivered to a same device that receives multimedia content by way of FLO technology.

Performance of transmitters, both within base stations and mobile devices, is crucial to success of a wireless system generally and in connection with FLO technology in particular. Additionally, as alluded to above, it is desirable to maintain low costs with respect to transmitters within wireless systems. Accordingly, wireless service providers may wish to determine performance of a transmitter designed and provided by a vendor prior to finalizing purchase of the transmitter. For instance, performance of channel estimation may be desirable to enable determination of signal-to-noise ratio, modulation error ratio, and various other performance metrics. More particularly, it may be desirable to perform phase correction with respect to transmitted signals and thereafter review particular parameters of a resultant signal to analyze transmitter performance. Conventional manners for monitoring transmitter performance, however, are computationally expensive and are not associated with sufficient accuracy.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to testing performance of a transmitter. Such testing can be performed while the transmitter is in the field, within a factory, etc. In an example, modulation error ratio can be indicative of how a transmitter is performing, and accordingly, it may be desirable to maintain such ratio within a predefined range. To determine modulation error ratio, noise variance with respect to a transmitter can be calculated (based upon phase estimation and correction). Therefore, the claimed subject matter relates to segmenting the superframe with respect to time and thereafter performing phase estimation/correction over individual segments. For example, a first order and/or a second order least squares phase estimation/correction algorithm can be employed. Thereafter, noise variance can be computed and utilized in connection with calculating MER.

In an aspect, a method for estimating noise variance associated with a transmitter is described herein. The method can comprise estimating phase alteration of a received signal through utilization of a least squares based phase estimation algorithm and determining an unbiased estimate of noise variance as a function of the estimated phase alteration. A communications apparatus is also disclosed, wherein the communications apparatus can include a memory that retains instructions for estimating phase alteration over time with respect to a received signal through employment of a least squares based phase estimation algorithm and estimating noise variance of the received signal based at least in part upon the estimated phase alteration. The communications apparatus can additionally include a processor that is configured to execute the instructions retained within the memory.

In accordance with another aspect, a communications apparatus can comprise means for estimating phase alteration associated with a received signal through employment of a least squares based phase estimation algorithm and means for determining an unbiased estimate of noise variance with respect to the received signal as a function of the estimated phase alteration. Still further, a machine-readable medium is described herein, wherein the machine-readable medium can have machine-executable instructions stored therein for receiving a signal, estimating phase alteration associated with the received signal through employment of a least squares based phase estimation algorithm, and determining an unbiased estimate of noise variance with respect to the received signal based at least in part upon the estimated phase alteration.

In yet another aspect, a processor can be configured to execute instructions for partitioning a received signal into a plurality of segments, wherein each of the segments includes K symbols. The processor can additionally be configured to execute instructions for determining an estimated phase alteration with respect to each segment of the received signal through utilization of a least squares based phase estimation algorithm Moreover, the processor can be configured to execute instructions for determining an estimate of noise variance with respect to the received signal as a function of the estimated phase alteration with respect to each segment of the received signal.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
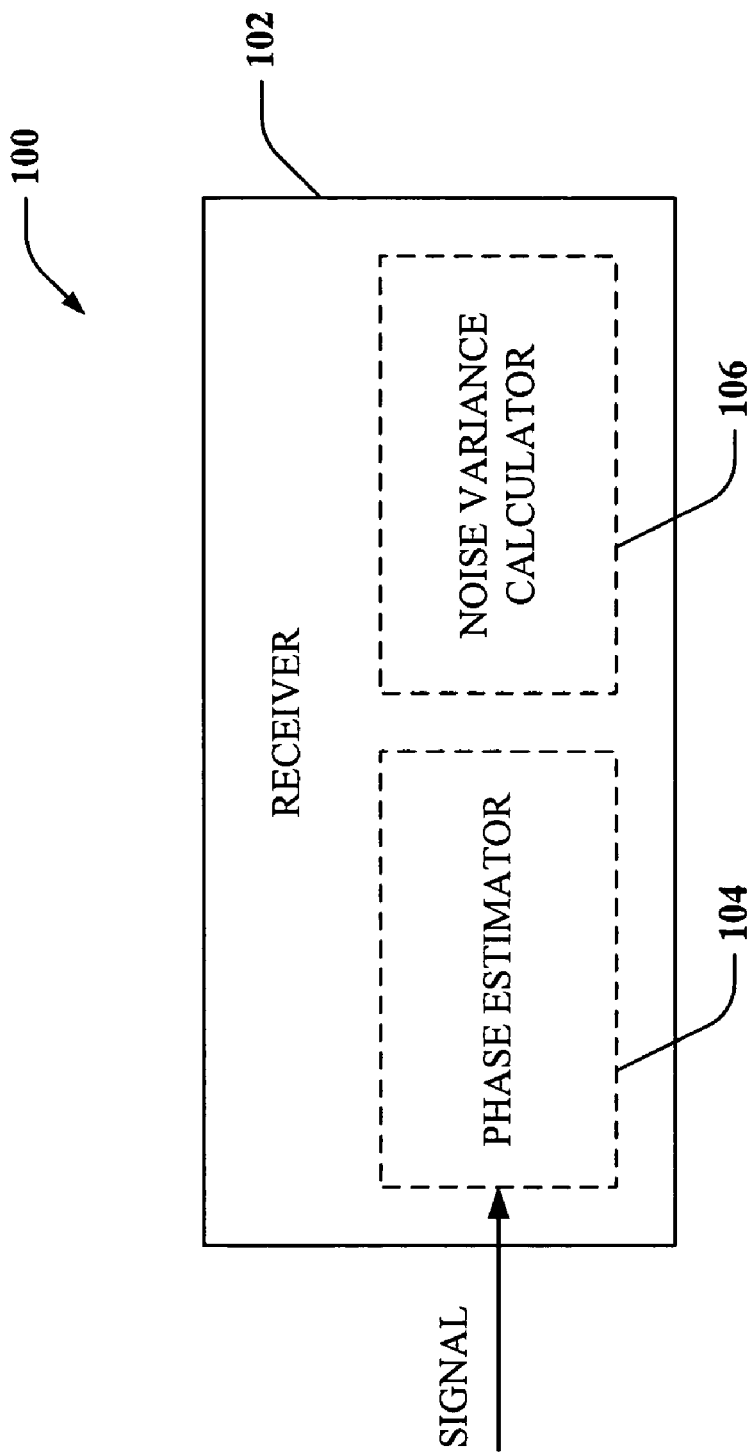
FIG. 1 is a high level block diagram of a system that facilitates determining an estimate of noise variance with respect to a received signal.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a user device. A user device can also be called a system, a subscriber unit, subscriber station, mobile station, mobile device, remote station, remote terminal, access terminal, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Base station transmitter performance is vital to the overall performance of a wireless system, particularly a wireless system utilizing FLO technology. Accordingly, prior to placing a transmitter in the field of use, it is desirable to test such transmitter to ensure that it is operating within certain specifications. In one example, it may be desirable to ascertain modulation error ratio (MER) with respect to a transmitter to ensure that MER falls within specifications. MER indicates mean or maximum deviation of I/Q values with respect to ideal signal states, and thus provides a measure of signal quality output by a transmitter. Computation of MER is described in greater detail below. In another example, group delay, frequency response (in-band and out-band), and other parameters can be determined to ensure that the transmitter accords to specifications. Still further, additive noise (e.g., noise that can be attributed to power amplifiers, filters, D/A converters, . . . ) can be computed to analyze transmitter performance. Additionally, noise variance with respect to a transmitter can be computed in connection with calculating MER.

Referring now to FIG. 1, a system 100 that facilitates calculating MER related to a transmitter (not shown) is illustrated. For example, system 100 can include a receiver 102 that receives a signal from a transmitter. For example, the received signal can conform to Orthogonal Frequency Division Multiplexing (OFDM), such that a superframe includes 1200 OFDM symbols (for a 6 MHz bandwidth case). It is understood, however, that any suitable frequency-division protocol that includes any suitable number of symbols is contemplated by the inventors and intended to fall under the scope of the hereto-appended claims. Frequency division based techniques, such as OFDM, typically separate the frequency spectrum into distinct channels by splitting the frequency spectrum into uniform chunks of bandwidth. For example, the frequency spectrum or band allocated for wireless cellular telephone communication can be split into 30 channels, each of which can carry a voice conversation, digital service, digital data, and/or the like. Each channel can be assigned to only one user device or terminal at a time. OFDM effectively partitions the overall system bandwidth into multiple orthogonal frequency channels. An OFDM system may use time and/or frequency division multiplexing to achieve orthogonality among multiple data transmissions for several terminals. For example, different terminals may be allocated different channels, and the data transmission for each terminal may be sent on the channel(s) allocated to such terminal. By using disjoint or non-overlapping channels for different terminals, interference among multiple terminals may be avoided or reduced, and improved performance may be achieved.

The receiver 102 of system 100 can be a test receiver that is utilized in connection with ensuring that a transmitter is performing according to specifications. For example, it may be desirable to compute MER with respect to a received signal (and thus with relation to a transmitter). Mathematically, a received sample of the signal received at receiver 102 can be expressed as:

$$r_k(n) = e^{j2\pi f n} h_k a_k(n) + z_k(n),$$

where $z_k(n)$ denotes an error term due to noise and uncorrectable non-linearity, $e^{j2\pi f n}$ is a phase shift due to a frequency offset f, $h_k$ is a complex channel coefficient of subcarrier k, and $a_k(n)$ is a modulation symbol on a kth subcarrier of an nth OFDM symbol. In an example, magnitude of $a_k(n)$ can be assumed to be unity to simplify analysis. Receiver 102 can be designed in connection with calculating non-linear distortion (including noise) introduced by a transmitter for each subcarrier. Such non-linear distortion can be characterized by a ratio of the signal power divided by variance of $z_k$, assuming that signal power is stationary with respect to n. Such ratio is referred to as MER.

To calculate MER, receiver 102 can include a phase estimator 104 that is utilized to determine an estimate of $h_k e^{j2\pi f n}$. In accordance with an aspect, phase estimator 104 can employ a least squares estimation algorithm in connection with estimating the phase of the received signal ($h_k e^{j2\pi f n}$). In more detail, for some transmitters, a frequency offset associated with output signals may not be constant. In other words, alteration of phase may not be linear with time. Accordingly, to calculate MER, it is desirable to compensate the phase ramp to enable averaging of channel estimations of each symbol within a superframe. It can be discerned that a constant frequency offset results in a phase change that is linear with time, while a frequency offset that is linear with time results in a phase change that is parabolic with respect to time. Theoretically, if a channel is perfect, phase change due to constant frequency offset can be cancelled by way of calculating slope of such phase change and utilizing a first order least squares phase correction algorithm based upon the calculated slope. Such an algorithm is provided below:

$$\phi_{est} = a \cdot t + b,$$

where parameters a and b are determined by a least squares estimation algorithm. If, on the other hand, it is assumed that the frequency offset changes linearly over time, then a second order least squares algorithm can be utilized to discern parameters a, b, and c. The estimated phase can be written as:

$$\phi_{est} = a \cdot t^2 + b \cdot t + c.$$

Such parameters can be computed through use of a general model of least squares estimation.

Typically, however, assumptions of constancy and linearity with respect to frequency offset over an entirety of a superframe are inaccurate, such that correcting phase alteration through use of first or second order algorithms does not enable sufficiently accurate averaging of channel estimates. To increase accuracy of estimates of phase alterations, phase estimator 104 can be employed to partition a superframe according to time. In other words, a superframe can be associated with a time T, and such time segment can be partitioned into N time segments (e.g., time segments that accord to 300 OFDM symbols), where N can be any suitable number. Assumptions relating to constancy and linearity with respect to a frequency offset over the plurality of time segments individually enable a much more accurate estimation of phase alteration of the received signal. It is understood, however, that phase estimator 104 need not partition a superframe into a plurality of time segments. Rather, phase estimator 104 can utilize first and/or second order least squares phase estimation algorithms without undertaking such partitioning when the assumption of constancy and linearity with respect to frequency offset over an entirety of a superframe are sufficiently accurate. Receiver 102 can also include a noise variance calculator 106 that determines noise variance as a function of the estimated phase alteration. Calculations that can be undertaken to such end are described in greater detail below.

While shown as being comprised within receiver 102, it is understood that phase estimator 104 and noise variance calculator 106 can be located in any suitable computing device that can be coupled to a transmitter (e.g., directly coupled to a transmitter to maintain a clean channel). Additionally, phase corrector 104 and noise variance calculator 106 can be employed to test a transmitter that is desirably utilized in a FLO broadcasting system. A FLO wireless system can be designed to broadcast real time audio and video signals, as well as non-real time services. The respective FLO transmission is carried out utilizing tall, high power transmitters to ensure wide coverage in a given geographical area. It is common to deploy multiple transmitters in certain regions to ensure that the FLO signal reaches a significant portion of the population in a given area. Typically, FLO technology utilizes OFDM to transmit data. It is to be understood, however, that the claimed subject matter is applicable to various communications protocols (wireless or wirelined, multiple carrier or single carrier).

Figure 2:
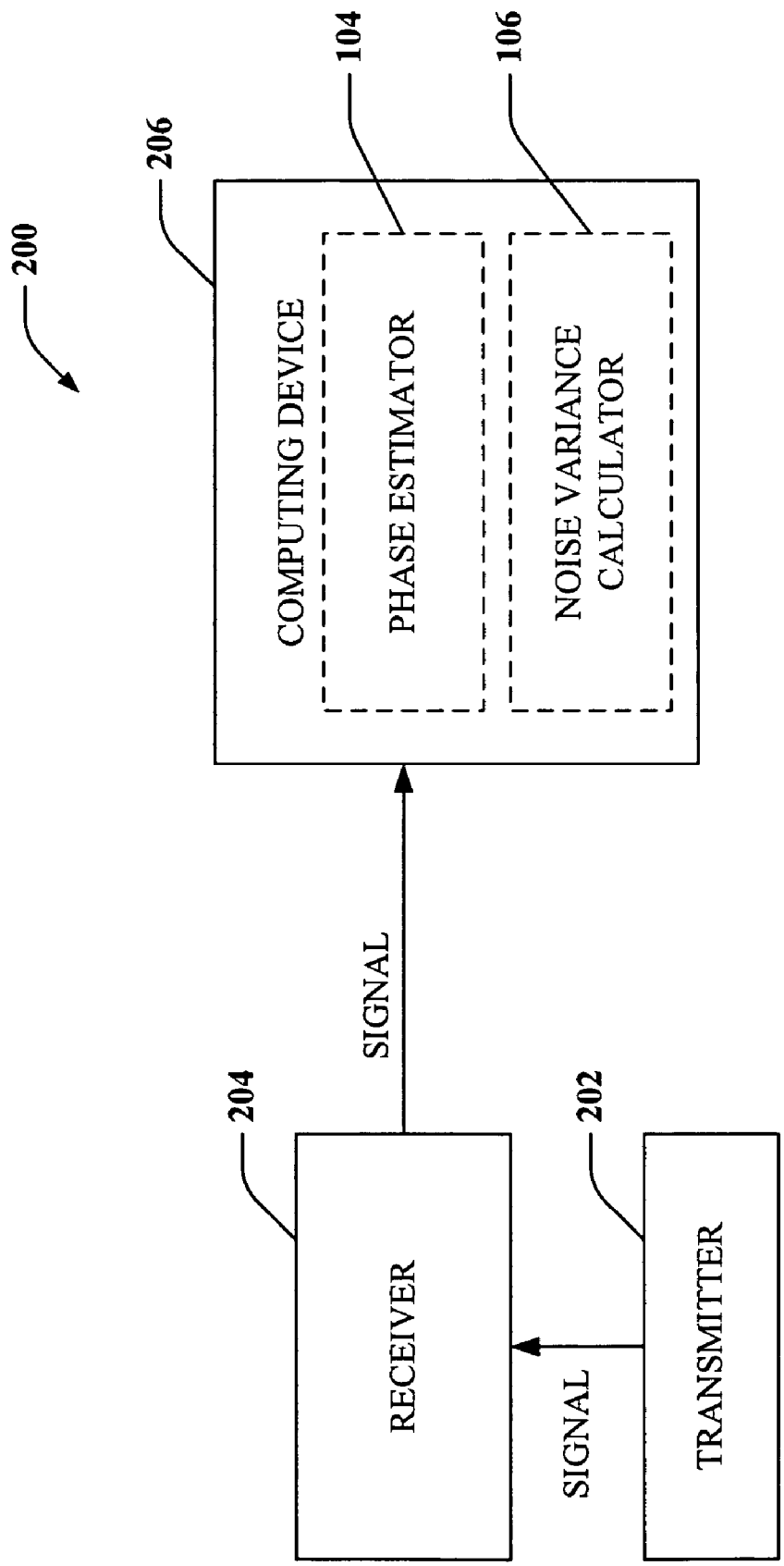
FIG. 2 is a block diagram of a system that illustrates estimating transmitter performance.

Referring now to FIG. 2, a system 200 that facilitates analyzing performance of a transmitter 202 is illustrated. For example, transmitter 202 can be a transmitter that is desirably employed in a FLO communications system. System 200 includes transmitter 202, which is communicatively coupled to a receiver 204. The coupling can be wireless coupling, wirelined coupling, or any other suitable coupling. In an example, transmitter 202 and receiver 204 can be in close proximity in an attempt to simulate a clean channel. Receiver 204 can in turn be communicatively coupled to a computing device 206, which can include phase estimator 104 and noise variance calculator 106. The system 200 is intended to illustrate that operations associated with phase estimator 104 and noise variance calculator 106 can be undertaken outside of receiver 204. Moreover, transmitter 202 and computing device 206 can be directly connected if computing device 206 includes functionality that enables receipt of signals.

As described above, phase estimator 104 can utilize first order least squares estimation algorithms to estimate phase alteration associated with a received signal and/or second order least squares estimation algorithm to estimate phase alteration associated with a received signal. Such phase estimation can be employed to significantly cancel nonlinear noise associated with the received signal while retaining quantization noise (noise from amplifiers, filters, etc.). The noise variance calculator 106 can determine noise variance associated with the received signal as a function of the least squares estimate(s).

Figure 3:
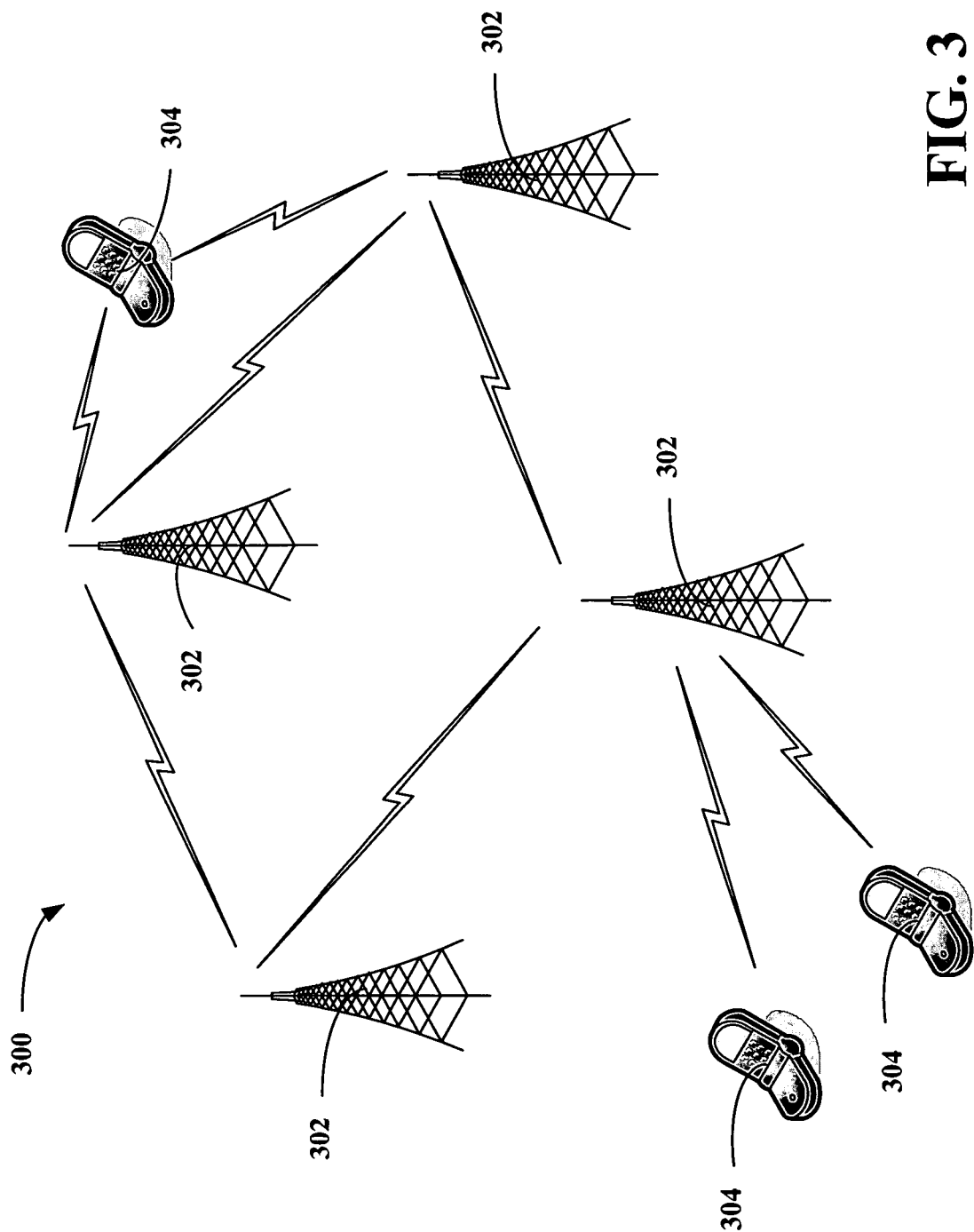
FIG. 3 is an illustration of a wireless communication system.

Referring now to FIG. 3, an example wireless communication system 300 is illustrated. System 300 can include one or more base stations 302 in one or more sectors that receive, transmit, repeat, etc., wireless communication signals to each other and/or to one or more mobile devices 304. A base station may be a fixed station used for communicating with terminals and may also be referred to as an access point, a Node B, or other terminology. Each base station 302 can comprise a transmitter chain and a receiver chain, each of which can in turn comprise a plurality of components associated with signal transmission and reception (e.g., processors, modulators, multiplexers, demodulators, demultiplexers, antennas, . . . ), as will be appreciated by one skilled in the art. Mobile devices 304 can be, for example, cellular phones, smart phones, laptops, handheld communication devices, handheld computing devices, satellite radios, global positioning systems, PDAs, and/or any other suitable device for communicating over wireless system 300. In addition, each mobile device 304 can comprise one or more transmitter chains and receiver chains, such as used for a multiple input multiple output (MIMO) system. Each transmitter and receiver chain can include a plurality of components associated with signal transmission and reception (e.g., processors, modulators, multiplexers, demodulators, demultiplexers, antennas, . . . ), as will be appreciated by one skilled in the art.

Each of the base stations 302 and mobile devices 304 can include one or more transmitters utilized to transmit signals to other base stations and mobile devices. Transmitters can be tested prior to utilization of such transmitters within a wireless communications environment. As described above, the transmitters can be associated with test receivers to enable testing of certain parameters relating to the transmitters. For example, the test receivers can be utilized in connection with computing MER.

Figure 4:
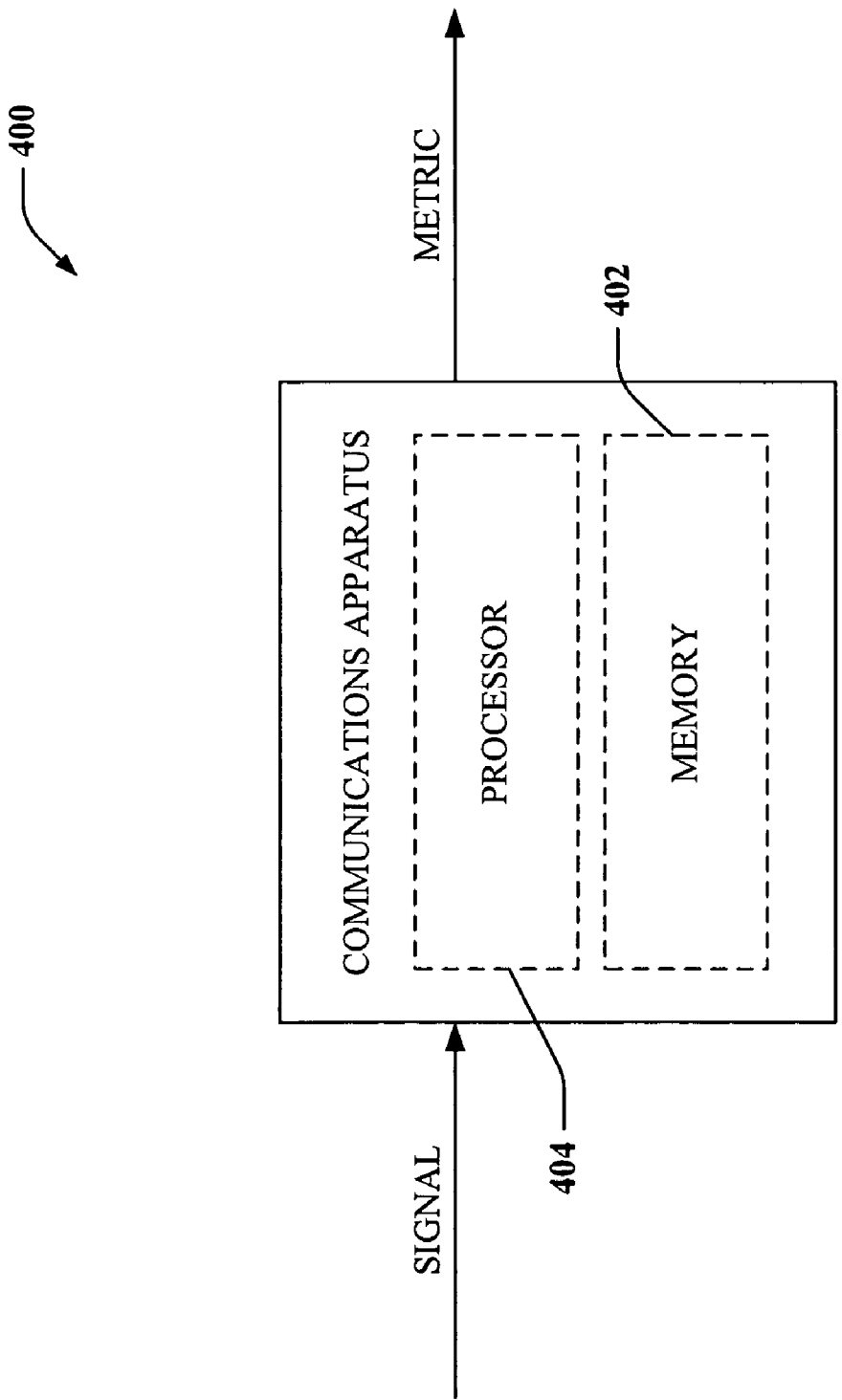
FIG. 4 is a high level block diagram of a wireless communications apparatus that can perform phase alteration estimation and estimate noise variance as a function of the estimated phase alteration.

Now turning to FIG. 4, a communications apparatus 400 that can be utilized in connection with testing a transmitter is illustrated. For instance, communications apparatus 400 can be employed to calculate noise variance, perform phase estimation, and/or determine MER based at least in part upon a received signal (sample). Communications apparatus 400 can include a memory 402 that can retain logic, code, and the like that enables, for instance, an estimation of phase to be calculated with respect to a received superframe. Moreover, memory 402 can include logic, code, and/or instructions for partitioning the received superframe based upon time. Pursuant to an example, memory 402 can include a least squares based first order algorithm to estimate phase alteration and/or a least squares based second order algorithm. Memory 402 can also include logic, code, and/or instructions for determining noise variance based at least in part upon a phase estimation (ascertained through utilization of the least squares algorithm(s)). Communications apparatus 400 can additionally include a processor 404 for executing instructions, code, and/or or logic within memory 404.

Referring to FIGS. 5, 6, 11, and 17-20, methodologies relating to testing FLO transmitter performance are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Figure 5:
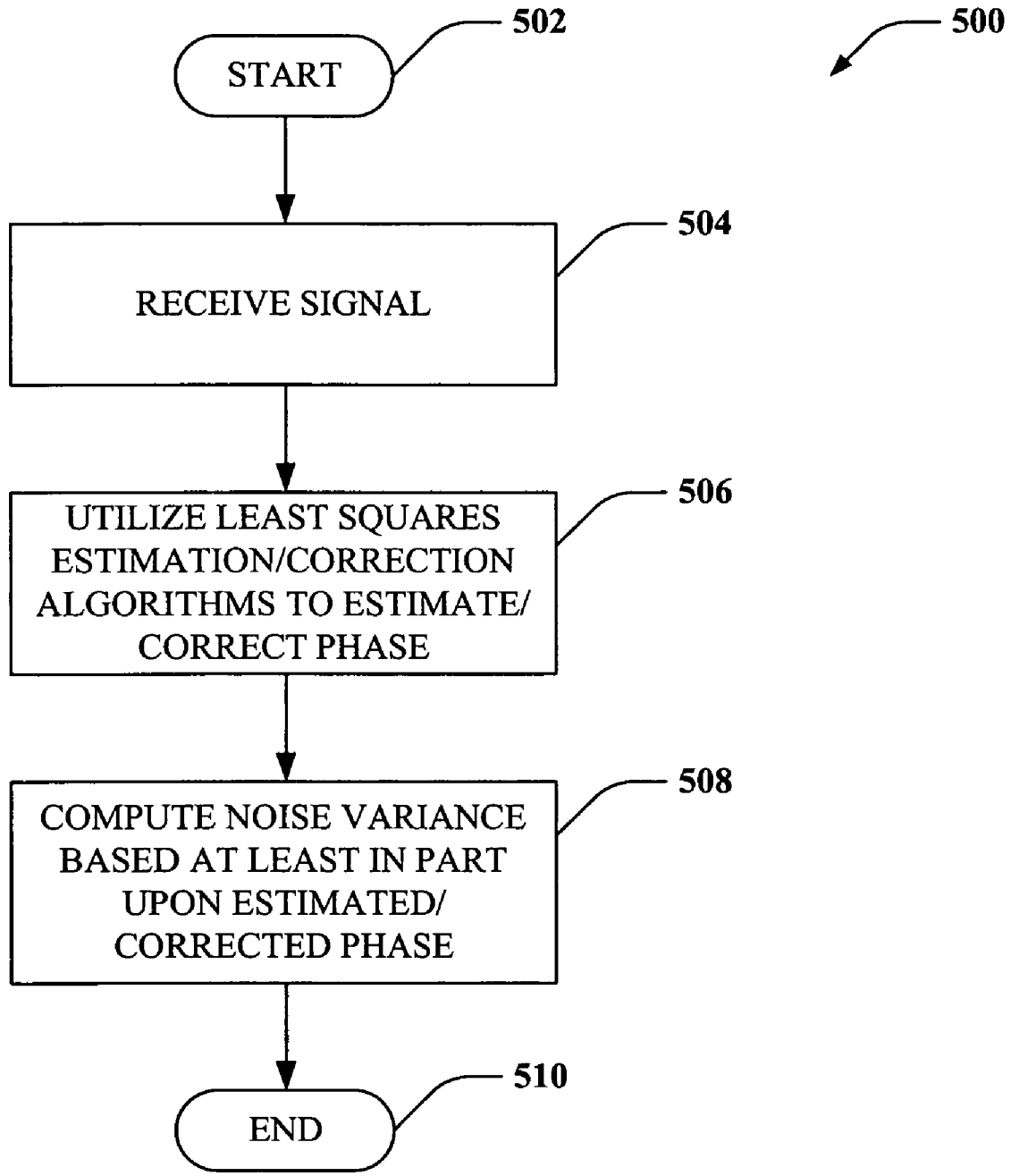
FIG. 5 is a representative flow diagram illustrating a methodology for estimating noise variance with respect to a received signal.

Turning specifically to FIG. 5, a methodology 500 for computing noise variance is illustrated. The methodology 500 starts at 502, and at 504 a signal is received. For example, the signal can be or include an OFDM superframe. At 506, a least squares based estimation algorithm can be employed to estimate phase alteration with respect to the received signal. For instance, the algorithm can be a first order algorithm or a second order algorithm. In another example, the algorithm can be executed on a portion of a superframe, such that phase alteration with respect to a portion of a superframe can be discerned. At 508, noise variance can be computed based at least in part upon the estimated/corrected phase. The methodology 500 can then complete at 510.

Figure 6:
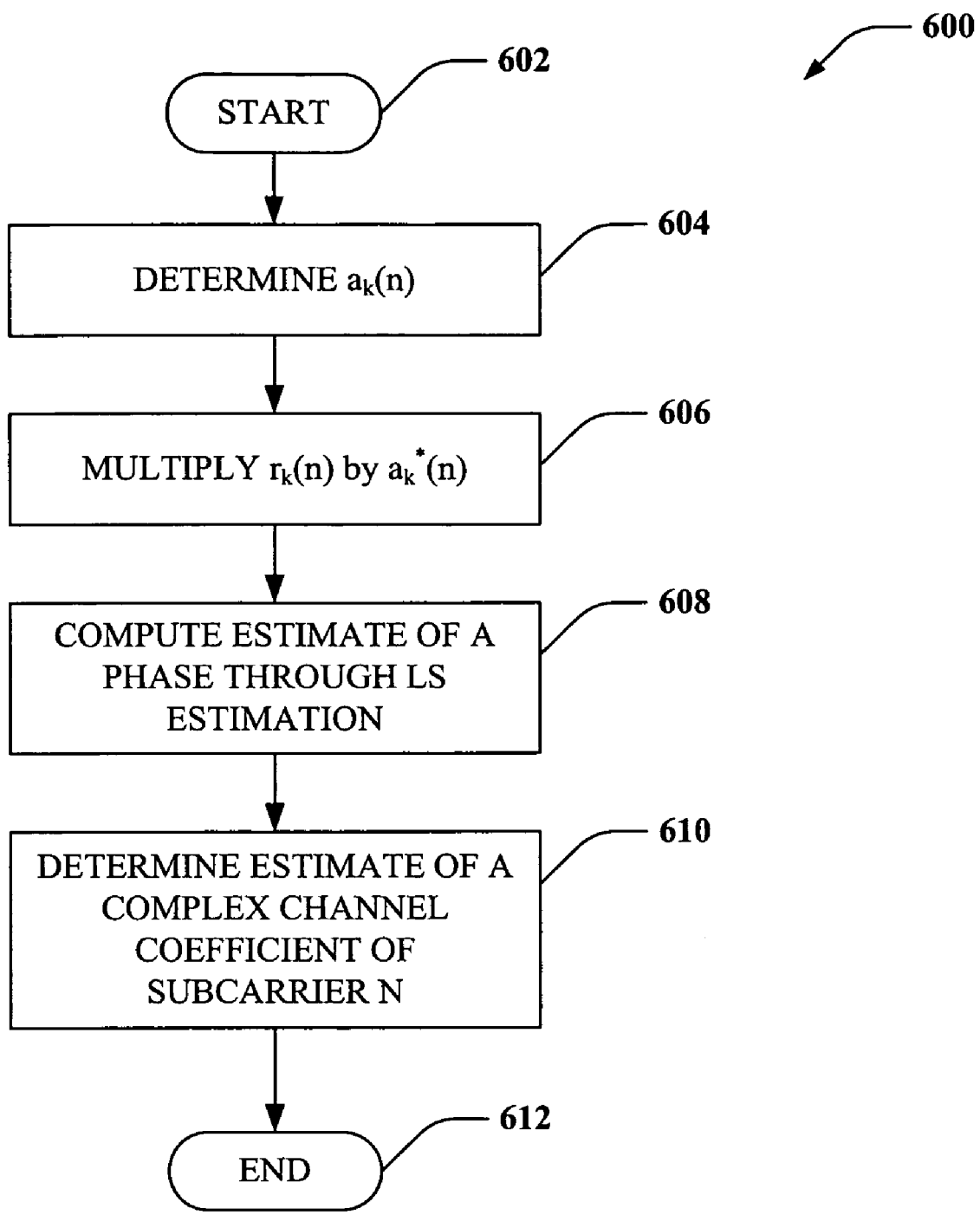
FIG. 6 is a representative flow diagram illustrating a methodology for determining modulation error ratio with respect to a transmitter.

Now referring to FIG. 6, a methodology 600 that can be employed in connection with estimating MER is illustrated. Prior to describing methodology 600, a general model of least squares estimation is provided. An observation vector $\vec{y}$ (which can be indicative of a phase ramp of a channel estimation) can be expressed by:

$$\vec{y} = A\vec{c} + \vec{z}, \qquad (1)$$

where $\vec{c} = [c_0, \ldots c_{L-1}]^H$ and is an unknown parameter vector, A is a known M by L constant matrix, and $\vec{z} = [z_0, \ldots z_{M-1}]^H$ is a noise vector whose components are zero mean and independent and identically distributed (i.i.d) with a variance of $\sigma_z^2$. H denotes a transpose and complex conjugate operation. The variable L can be equal to an order associated with phase estimation plus one. For example, for first order phase estimation, L=2; for second order phase estimation, L=3, etc. M is a number of samples that are associated with the estimation. For instance, in a test receiver application, M can be equal to a number of OFDM symbols in a segment (e.g., a segment of a superframe). Additionally, it may be desirably to satisfy $M \geq L$.

The least squares estimate ($\vec{\hat{c}} = [\hat{c}_0, \ldots \hat{c}_{L-1}]^H$) of $\vec{c}$ can reduce the Euclidean norm of the error vector $\vec{e} = [e_0, \ldots e_{L-1}]^H$, which is defined by $\vec{e} = \vec{y} - \vec{\hat{y}} = \vec{y} - A\hat{c}$, whose Euclidean norm can be expressed as:

$$\epsilon = \vec{e}^H \vec{e} = [\vec{y} - A\vec{\hat{c}}]^H [\vec{y} - A\vec{\hat{c}}],$$

where $\vec{\hat{y}}$ is the least squares based phase ramp estimation. By letting the derivative of $\epsilon$ with respect to $\vec{\hat{c}}$ be equal to zero, the least squares estimate of $\vec{\hat{c}}$ can satisfy:

$$A^H [\vec{y} - A\vec{\hat{c}}_{LS}] = A^H \vec{y} - A^H A \vec{\hat{c}}_{LS} = 0 \text{ or}$$

$$\vec{\hat{c}}_{LS} = (A^H A)^{-1} A^H \vec{y}. \quad (2)$$

By substituting the expression of $\vec{y}$ into the above equation, it can be discerned that $$\vec{\hat{c}}_{LS} = (A^H A)^{-1} A^H (A\vec{c} + z) = (A^H A)^{-1} A^H A \vec{c} + (A^H A)^{-1} A^H \vec{z}$$
$$\vec{z} = \vec{c} + (A^H A)^{-1} A^H \vec{z}.$$

Thus, $\vec{\hat{c}}_{LS}$ is an unbiased estimate of $\vec{c}$.

Moreover, the least squares estimate of $\vec{y}$ can be expressed by:

$$\vec{\hat{y}}_{LS} = A \vec{\hat{c}}_{LS} = A(A^H A)^{-1} A^H \vec{y} = A\vec{c} + A(A^H A)^{-1} A^H \vec{z}.$$

The norm of the error vector generated by the least squares estimate can be expressed as:

$$\tilde{\epsilon}_{LS} = [\vec{y} - \vec{\hat{y}}_{LS}]^H [\vec{y} - \vec{\hat{y}}_{LS}]$$
$$= \vec{z}^H [I - A(A^H A)^{-1} A^H] \vec{z}$$
$$= \vec{z}^H \vec{z} - \vec{z}^H A(A^H A)^{-1} A^H \vec{z}.$$

The expectation of the norm of the error vector is:

$$E[\epsilon_{LS}] = E[\vec{z}^H \vec{z}] - E[\vec{z}^H A(A^H A)^{-1} A^H \vec{z}] = M\sigma_z^2 - E[\vec{z}^H A(A^H A)^{-1} A^H \vec{z}],$$

where $E[\epsilon_{LS}]$ is the mean of the norm of the error vector. Since the above equation is a scalar equation and using the well known equality in matrix theory that the trace of a square matrix AB is equal to the trace of BA, the second term in the above equation can be written as:

$$E[\vec{z}^H A(A^H A)^{-1} A^H \vec{z}] = E[\text{Trace}\{\vec{z}^H A(A^H A)^{-1} A^H \vec{z}\}]$$
$$= E[\text{Trace}\{A(A^H A)^{-1} A^H \vec{z}\vec{z}^H\}]$$
$$= \sigma_z^2 \text{Trace}\{A(A^H A)^{-1} A^H E[\vec{z}\vec{z}^H]\}$$

It can be noted that elements of the noise vector $\vec{z}$ are i.i.d and are associated with a variance of $\sigma_z^2$, and, as shown above, $E[\vec{z}\vec{z}^H] = \sigma_z^2 I$. Therefore, $$\text{Trace}\{A(A^H A)^{-1} A^H E[\vec{z}\vec{z}^H]\} = \text{Trace}\{A(A^H A)^{-1} A^H \sigma_z^2 I\}$$
$$= \sigma_z^2 \text{Trace}\{A(A^H A)^{-1} A^H\}$$
$$= \sigma_z^2 \text{Trace}\{(A^H A)^{-1} A^H A\}$$
$$= \sigma_z^2 \text{Trace}\{I_{L \times L}\}$$
$$= L\sigma_z^2.$$

Finally, the following can be obtained from the above:

$$E[\epsilon_{LS}] = (M - L)\sigma_z^2. \quad (3)$$

Thus, the variance of each component of the estimation error vector is $$\left(1 - \frac{L}{M}\right)\sigma_z^2.$$

In other words, the variance of least squares estimation error is smaller than the variance of the additive noise in the input data by a factor of $$1 - \frac{L}{M}.$$

The reduction in error variance is due to the fact that the same set of data can be used for least squares estimation and for computing the error vector. As a result, the estimated parameters can "fit better" with respect to the set of data used to compute the error vector. The result can be different, as shown below.

It can be assumed that a first data vector $\vec{y}$ is used to perform least squares estimation of the estimation parameters and a second data vector $\vec{y}'$ can be used to compute the error vector. $\vec{y}'$ can have substantially similar statistics as $\vec{z}$ but be independent of $\vec{z}$. Namely, the following can be defined, where $\vec{z}'$ is a noise vector that has the same dimension, variance and mean as $\vec{z}$, but is independent of $\vec{z}$.

$$\vec{y}' = A\vec{c} + \vec{z}'$$

By using $\vec{y}'$ instead of $\vec{y}$ to compute the error vector as described above, the norm of the error vector can be expressed as:

$$\tilde{\epsilon}_{LS} = [\vec{y}' - \vec{\hat{y}}_{LS}]^H [\vec{y}' - \vec{\hat{y}}_{LS}]$$
$$= \vec{z}'^H \vec{z}' - \vec{z}'^H A(A^H A)^{-1} A^H \vec{z} - \vec{z}^H A(A^H A)^{-1} A^H \vec{z}' +$$
$$\vec{z}^H A(A^H A)^{-1} A^H \vec{z}.$$

As can be discerned from the above, computation of the expectation $\vec{z}^H A(A^H A)^{-1} A^H \vec{z}'$ can be defined as:

$$E[\vec{z}^H A(A^H A)^{-1} A^H \vec{z}'] = \text{Trace}\{A(A^H A)^{-1} A^H E[\vec{z}'\vec{z}^H]\} = 0,$$

since $\vec{z}$ and $\vec{z}\,'$ are uncorrelated and are associated with zero mean. Additionally, $E[\vec{z}\,'^H A(A^H A)^{-1} A^H \vec{z}\,]=0$. Thus, the following can be obtained:

$$E[\tilde{\epsilon}_{LS}]=E[\vec{z}\,'^H \vec{z}\,']+E[\vec{z}\,^H A(A^H A)^{-1} A^H \vec{z}\,]=M\sigma_z^2+L\sigma_z^2=(M+L)\sigma_z^2.$$

The variance of the components of the error vector is thus $$\left(1+\frac{L}{M}\right)\sigma_z^2.$$

In other words, when a different set of data vectors is used in computing the error vector, variance of the error vector components is larger than the variance of the noise components in the input data by a factor of $$1+\frac{L}{M}.$$

If a substantially similar set of data is utilized to obtain a least squares estimation of the coefficient and to calculate the mean of the norm of the error vector $E[\epsilon_{LS}]$, the variance is smaller:

$$\left(1-\frac{L}{M}\right)\sigma_z^2.$$

If a different set of data is utilized to obtain the least squares estimation of the coefficient and calculate the mean of the norm of the error vector $E[\epsilon_{LS}]$, the variance is larger:

$$\left(1+\frac{L}{M}\right)\sigma_z^2.$$

Now with reference to methodology 600, such methodology 600 starts at 602, and at 604 $a_k(n)$ is determined with respect to a received sample, wherein $a_k(n)$ is a modulation symbol on a kth subcarrier of an nth OFDM symbol. For example, the magnitude of $a_k(n)$ can be assumed to be unity (the modulation symbol has unit power). The received sample can be expressed as:

$$r_k(n)=e^{j2\pi fn}h_k a_k(n)+z_k(n),$$

where $z_k(n)$ denotes the error term due to noise and uncorrectable non-linearity associated with the received sample, $e^{j2\pi fn}$ is the phase shift due to frequency offset f, and $h_k$ is the complex channel coefficient of subcarrier k. An ML-based sequence detection algorithm can be utilized to get a hard decision of the modulation symbol $a_k(n)$. Non-linear distortion (including noise) introduced by a transmitter that transmits the received sample may be desirably calculated and, for the kth subcarrier, can be characterized by the ratio of the signal power, which can be expressed by $E[|h_k a_k(n)|^2]$, divided by variance $z_k$, assuming that it is stationary with respect to n. Such ratio can be referred to as MER. Act 604 (determining $a_k(n)$) can be undertaken by analyzing the received sample.

At 606, $r_k(n)$ is multiplied by $a_k^*(n)$ to generate $r_k'(n) = h_k e^{j2\pi fn} + z_k'(n)$ for all n. As, due to a previous assumption, the magnitude of $a_k^*(n)$ is equal to one, variance of $z_k'(n)=a_k^*(n)z_k(n)$ is equal to the variance of $z_k(n)$. At 608, an estimate of a phase is determined through least squares estimation. For instance, the least squares estimation can be undertaken through utilization of a first or second order least squares estimation algorithm. The phase of $h_k e^{j2\pi fn}$ can be mathematically denoted as $\tilde{\phi}_k(n)=2\pi fn+\arg(h_k)$, and the estimate of such can be denoted as $\hat{\phi}_k(n)$. To estimate such phase, the phase of $r_k'(n)$ can be computed through utilization of the following:

$$\phi_k(n)=\arg[z_k'(n)]=2\pi fn+\arg(h_k)+v(n)\approx an+b+v(n),$$

where v(n) is an additive noise term. Under the condition that $\sigma_z^2 \ll |h_k|^2$ (e.g., the received signal has a high signal to noise ratio), v(n) can be approximately equal to a component of $z_k'(n)$ that is orthogonal to $z_k'(n)$ and scaled by $$\frac{1}{|h_k|^2}$$

and can be Gaussian with zero mean and a variance of $$\frac{\sigma_z^2}{2|h_k|^2}.$$

The general least squares estimation formulation discussed above can be applied to obtain least squares estimates of a and b by defining, for instance, $$\vec{y} = [\phi_k(0), \phi_k(1), \ldots \phi_k(N-1)]^t,$$
$$\vec{z} = [v(0), v(1), \ldots v(N-1)]^t, \text{ and}$$
$$A = \begin{pmatrix} 1 & 1 & 1 & \ldots & 1 \\ 0 & 1 & 2 & \ldots & N-1 \end{pmatrix}$$

(where N can be a number of OFDM symbols in a segment). The least squares estimation of $\vec{c}=[b,a]^t$ can be computed according to (2) by:

$$\hat{\vec{c}}_{LS} = (A^H A)^{-1} A^H \vec{y}$$

$$= \begin{pmatrix} \frac{2(2N-1)}{N(N+1)} & \frac{-6}{N(N+1)} \\ \frac{-6}{N(N+1)} & \frac{12}{N(N-1)(N+1)} \end{pmatrix} \begin{pmatrix} \sum_{n=0}^{N-1} \phi_k(n) \\ \sum_{n=0}^{N-1} n\phi_k(n) \end{pmatrix}.$$

More particularly, $$\hat{b} = \frac{2}{N(N+1)}\left((2n-1)\sum_{n=0}^{N-1}\phi_k(n) - 3\sum_{n=0}^{N-1}n\phi_k(n)\right), \text{ and}$$

$$\hat{a} = \frac{6}{N(N+1)}\left(-\sum_{n=0}^{N-1}\phi_k(n) + \frac{2}{(N-1)}\sum_{n=0}^{N-1}n\phi_k(n)\right).$$

As stated above, the phase estimate of $h_k e^{j2\pi fn}$ is $\phi_k(n) = an + b$. Using results given by equation (3), it can be discerned that the variance of the error between $\phi_k(n)$ and $\hat{\phi}_k(n)$ can be equal to $$\sigma_\phi^2 = \frac{1-2}{N}\sigma_v^2 = \frac{\frac{1-2}{N}\sigma_z^2}{2|h_k|^2}.$$

At 610, an estimate of the magnitude of a complex channel coefficient of subcarrier n can be ascertained. Act 610 can also include multiplying $r_k'(n)$ by $e^{-j\hat{\phi}_k(n)}$ to yield $r_k''(n) = |h_k| + z_k''(n)$, which can thereafter be employed to estimate the magnitude of $h_k$. With more specificity, $$|\hat{h}_k| = Re\left[\frac{1}{N}\sum_{n=0}^{N-1} r_k''(n)\right].$$

It can be ascertained that $r_k'(n)$ can be rotated around an x-axis. Since the least squares estimate of the phase can be used for rotation rather than the true phase, the variance of the imaginary component can be approximately equal to $$|h_k|^2 \sigma_{\hat{\phi}}^2 = \left(1 - \frac{2}{N}\right)\frac{\sigma_z^2}{2}.$$

The variance of the estimated real noise component can be equal to $$\left(1 - \frac{1}{N}\right)\frac{\sigma_z^2}{2}.$$

Thus, the total estimated variance is $$\hat{\sigma}_{z_k}^2 = \left(1 - \frac{3}{2N}\right)\sigma_z^2.$$

In other words, the estimate of the true noise variance used in an MER calculation can be computed by $$\frac{\sigma_z^2}{1 - \frac{3}{2N}}.$$

Therefore, to obtain an unbiased estimate of $\sigma_z^2$, a scaling factor $\beta$ can be utilized, where $$\beta = \frac{1}{N\left(1 - \frac{3}{2N}\right)} = \frac{1}{N - 1.5}.$$

Many of the calculations described herein are based upon an assumption that a channel coefficient can be modeled as a constant term with a linear phase ramp for N captured samples. In reality, however, the linear phase ramp assumption may not hold for an entire capture and the MER computed will treat such non-linear phase ramp as non-linear distortion. However, as long as linearity holds for a sufficiently long data segment, performance of a test receiver will not degrade. Thus, the MER computed in such a manner does not reflect test receiver performance. Thus, data can be divided into segments before performing the noise variance estimate.

Therefore, an entire capture can be divided into K segments, each of which includes M samples. It can be ascertained, however, that segments may include a non-equivalent number of samples. The estimation procedure can be substantially similar to that described above except that phase estimation (act 608) can be performed on each M sample segment. The samples in each segment are rotated around a real axis by using the phase estimated based on the samples of a segment. The above analysis remains valid, the difference being that the variance of the orthogonal component of error such obtained will be:

$$\frac{1}{K*M}\sum_{k=0}^{K}\sum_{n=0}^{M-1}\frac{\frac{1-2}{M}\sigma_z^2}{2} = \frac{1}{N}\sum_{k=0}^{K}\frac{(M-2)\sigma_z^2}{2}$$

$$= \frac{\frac{1}{N}(N-2K)\sigma_z^2}{2}.$$

Using a substantially similar derivation as above, the coefficient $\beta$ to yield the unbiased estimate (with respect to a first order least squares estimation algorithm) can be $$\beta = \frac{1}{N - 0.5 - K}$$

The above can be extended to a case that a phase change can be modeled as a second order curve. In such an instance, the matrix A in least squares estimation can be expressed as:

$$A = \begin{pmatrix} 1 & 1 & 1 & \cdots & 1 \\ 0 & 1 & 2 & \cdots & N-1 \\ 0 & 1 & 4 & \cdots & (N-1)^2 \end{pmatrix}.$$

The coefficient $\beta$ to generate the unbiased error variance estimate for the second order least squares estimation can be:

$$\beta = \frac{1}{N - 0.5 - 1.5K}.$$

Such coefficient can be utilized in connection with determining an unbiased estimate of the variance $z_k(n)$. More particularly, the unbiased estimate can be determined through the following algorithm:

$$\hat{\sigma}_{z_k}^2 = \beta \sum_{n=0}^{N-1} |r_k''(n) - |\hat{h}_k||^2,$$

where β can be dependent upon whether the phase estimation is accomplished through use of a first or second order least squares based algorithm. Additionally, $r''_k(n)$ and $h_k$ can be considered in-phase and quadrature components of noise, respectively. The methodology 600 then completes at 612.

Figure 7:
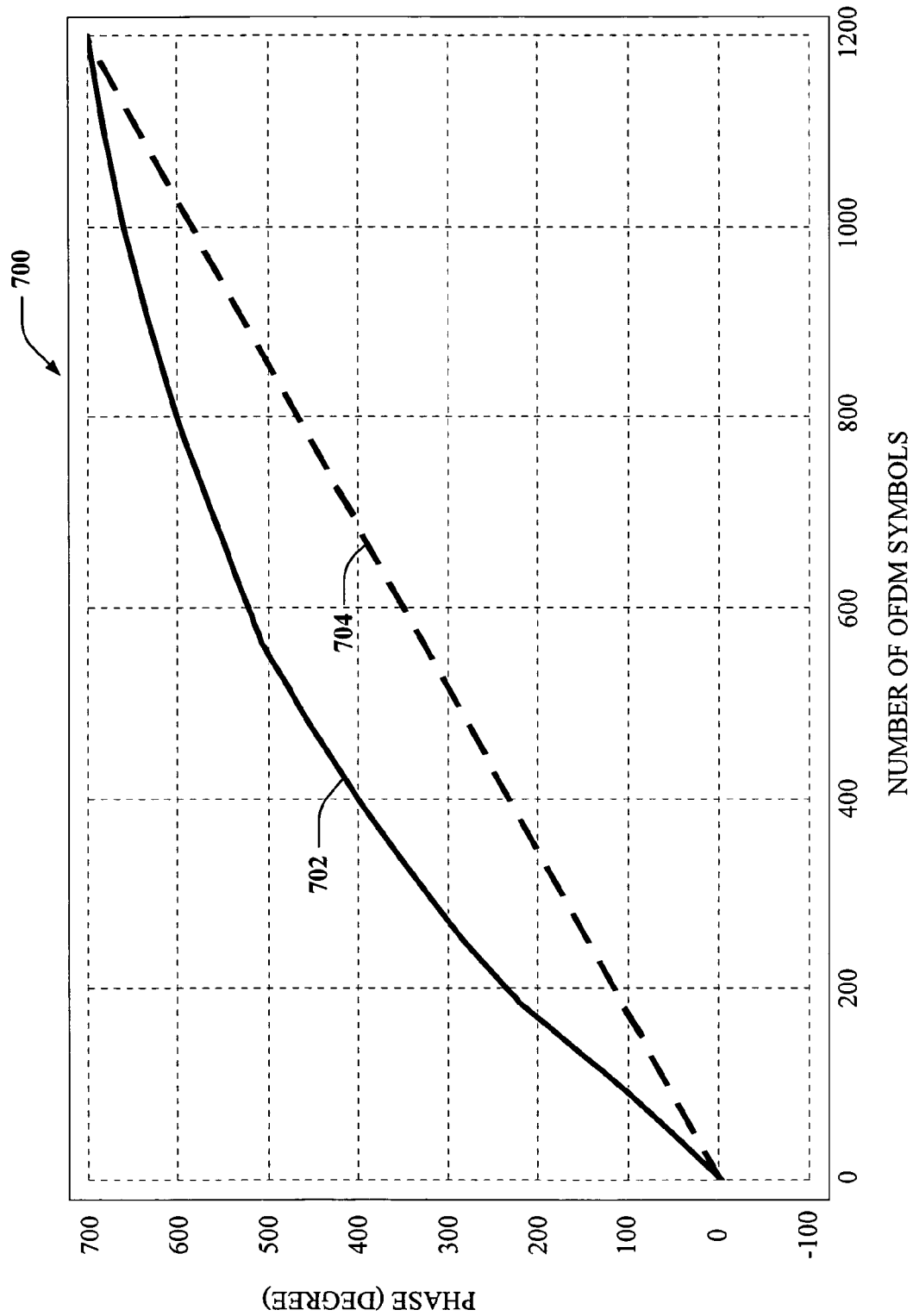
FIG. 7 is a graphical representation of a linear estimation of phase alteration over an entirety of a superframe in comparison to an actual phase alteration.

Referring now to FIG. 7, a graphical representation 700 illustrating phase estimation/correction is shown. The graphical representation 700 includes a line 702 indicating an actual phase for a received signal with respect to received symbols over time. Thus, it can be discerned that the phase alters non-linearly over time. Another line 704 indicates a first-order estimation of phase over an entirety of the superframe (shown as 1200 symbols for a 6 MHz bandwidth case). It is understood, however, that a superframe can include any suitable number of symbols, and that the number 1200 should be considered an example and not limitative of the claimed subject matter. It can be discerned from the graphical representation 700 that use of a linear algorithm for estimation/correction of phase alteration over time is insufficient, as a substantial amount of non-linear noise remains (thereby rendering it difficult to determine transmitter performance).

Figure 8:
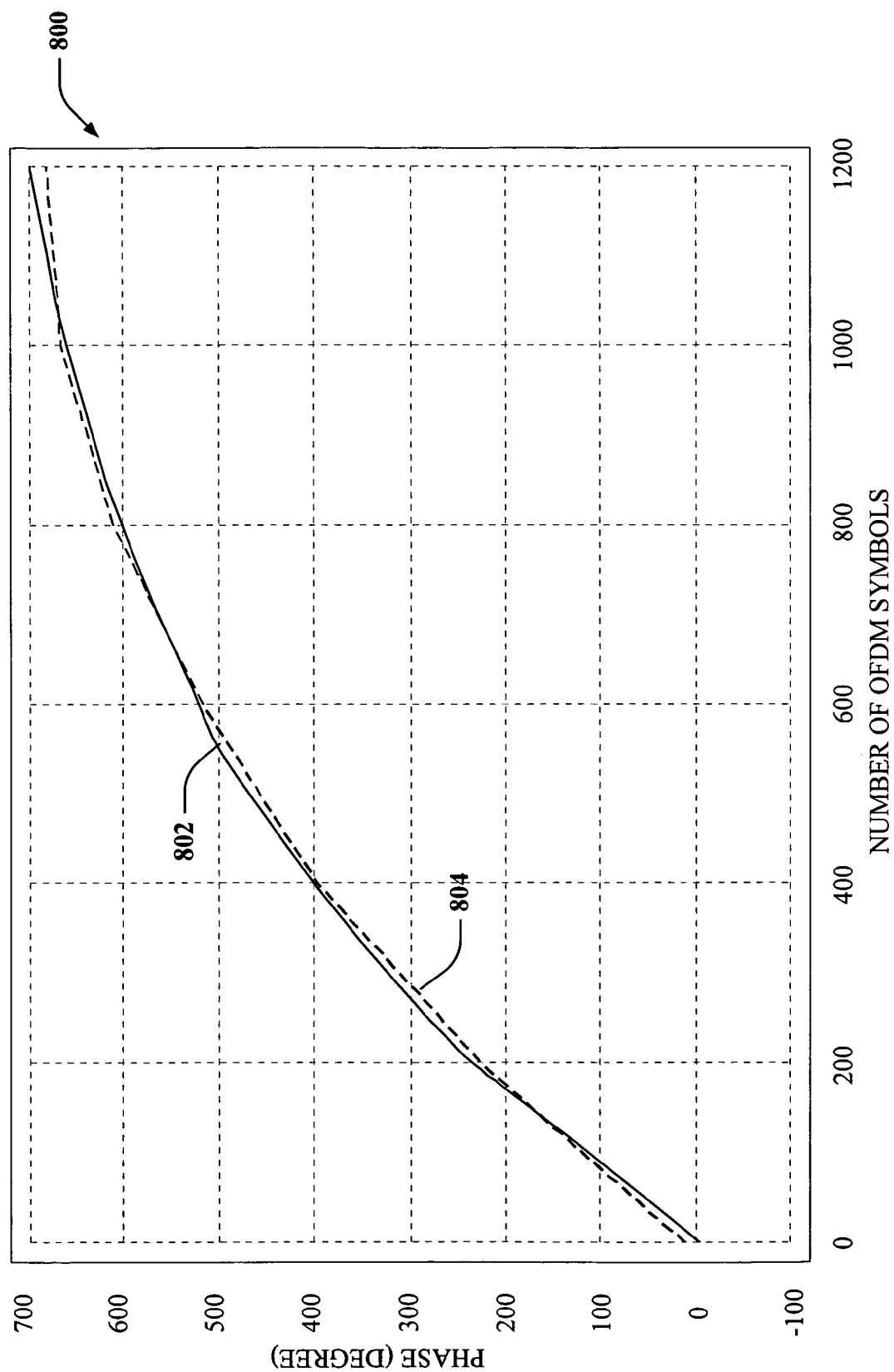
FIG. 8 is a graphical representation of a second order estimation of phase alteration over an entirety of a superframe in comparison to an actual phase alteration.

Turning now to FIG. 8, a graphical representation 800 illustrating phase estimation/correction is depicted. A first line 802 again indicates phase of a received signal altering as OFDM symbols are processed. A second line 804 illustrates a second-order estimation of the phase over an entirety of a superframe. While the second-order estimation is more accurate than the first-order approximation, there remains significant discrepancy between actual phase with respect to processed symbols and estimated phase with respect to processed symbols.

Figure 9:
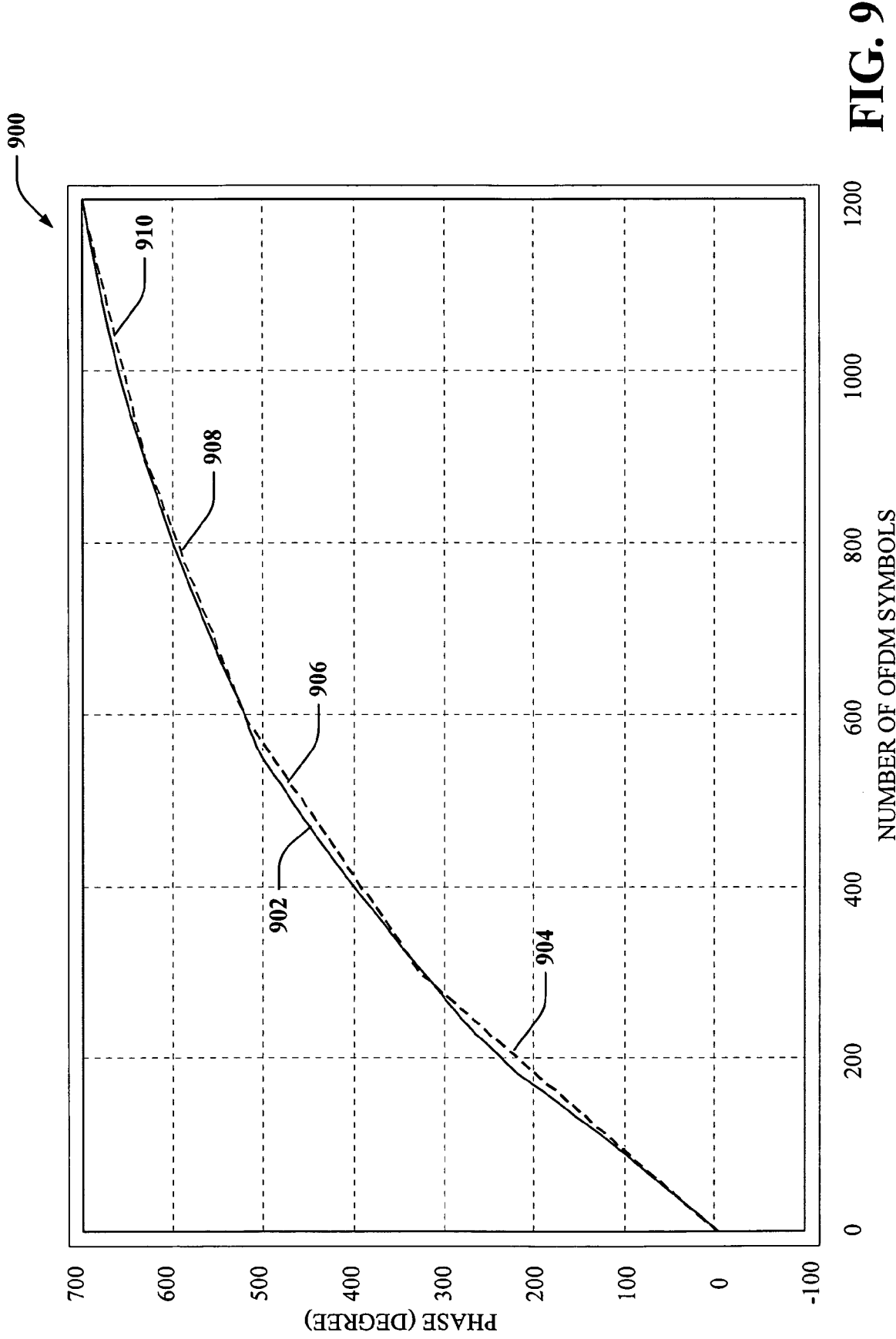
FIG. 9 is a graphical representation of estimations of phase alteration of segments of a superframe.

Now referring to FIG. 9, a graphical representation 900 illustrating phase estimation/correction through utilization of segmentation of the superframe is shown. In this example graphical representation 900, the superframe has been partitioned into 4 segments (of 300 OFDM symbols). That representation 900 further illustrates that, upon segmenting, a linear estimation/correction algorithm has been applied. In more detail, a first line 902 represents actual phase with respect to OFDM symbols, and lines 904, 906, 908, and 910 illustrate linear estimates of the four segments. As can be easily ascertained from comparison of FIG. 9 with FIG. 7, the segmented linear estimation is much more proximate to actual phase than the linear estimate over the entirety of the superframe. In other words, a significant portion of nonlinear noise is cancelled while quantization noise is not drastically affected (thereby enabling analysis of quantization noise associated with a transmitter).

Figure 10:
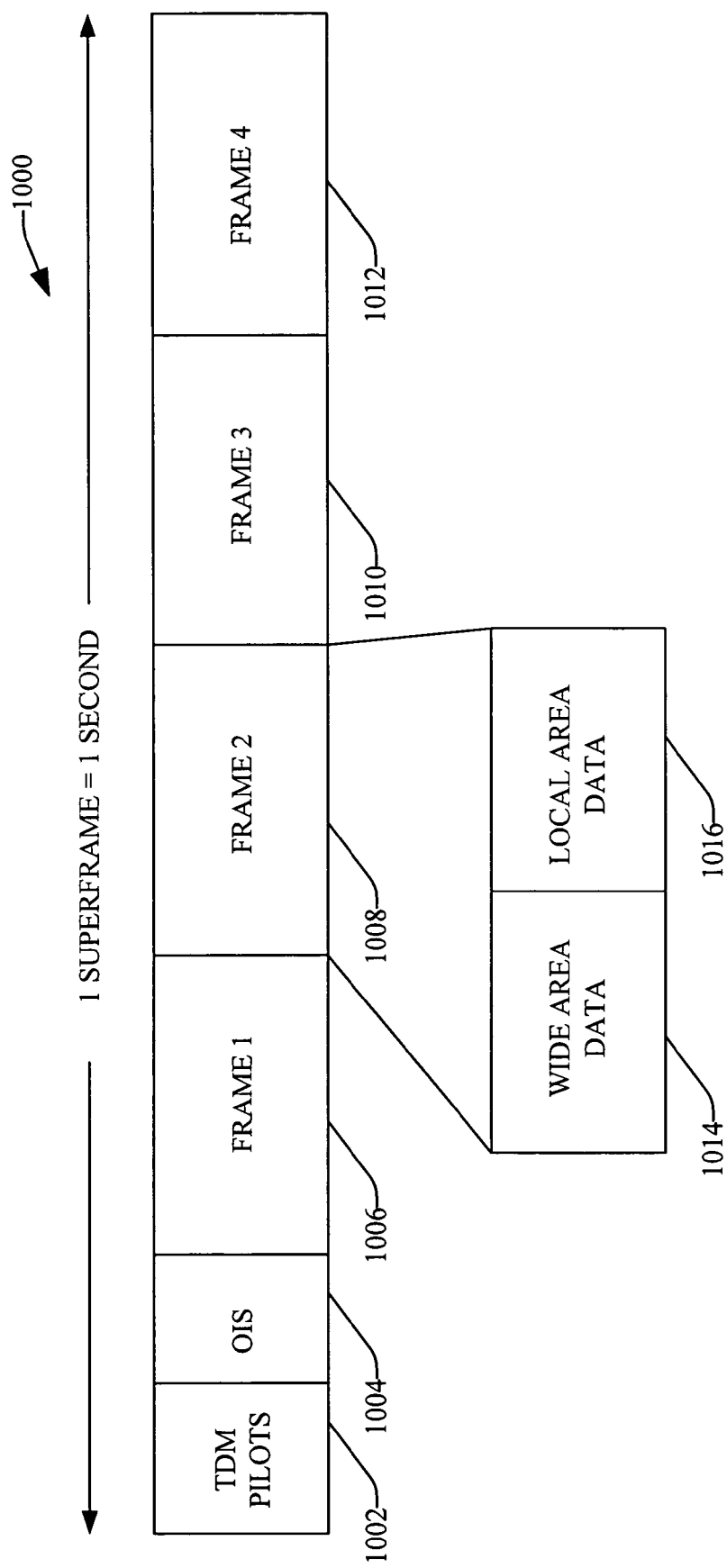
FIG. 10 illustrates an example superframe.

Proceeding to FIG. 10, a FLO physical layer superframe 1000 is illustrated. In an embodiment for 6 MHz bandwidth case, a superframe can be equal to 1200 OFDM symbols with a one second time duration for 6 Mhz bandwidth case. Generally, FLO transmitted signals are organized into superframes as illustrated at 1000. Each superframe can be comprised of four frames of data, including TDM pilot symbols (Time Division Multiplexed) 1002, Overhead Information Symbols (OIS) 1004 and frames 1006, 1008, 1010, 1012, containing wide-area 1014 and local-area data 1016. The pilot symbols can include four predefined pilot symbols: time division multiplexed 1 (TDM1), wide area identification channel (WIC), local area identification channel (LIC) and time division multiplexed 2 (TDM2). The pilot symbols can be used for synchronization, timing and identification purposes. Consequently, the structure of pilot symbols are distinct from those of the OFDM data symbols contained with the four frames of data 1006, 1008, 1010 and 1012. The pilot symbols can allow for rapid acquisition of the OIS. The OIS describes the location of the data for each media service in the superframe.

Typically, each superframe consists of 200 OFDM symbols per MHz of allocated bandwidth (1200 symbols for 6 MHz), and each symbol can contain 7 interlaces of active subcarriers. For example, each symbol can include 4096 subcarriers, with 4000 subcarriers available for data. Each interlace of active subcarriers is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Figure 11:
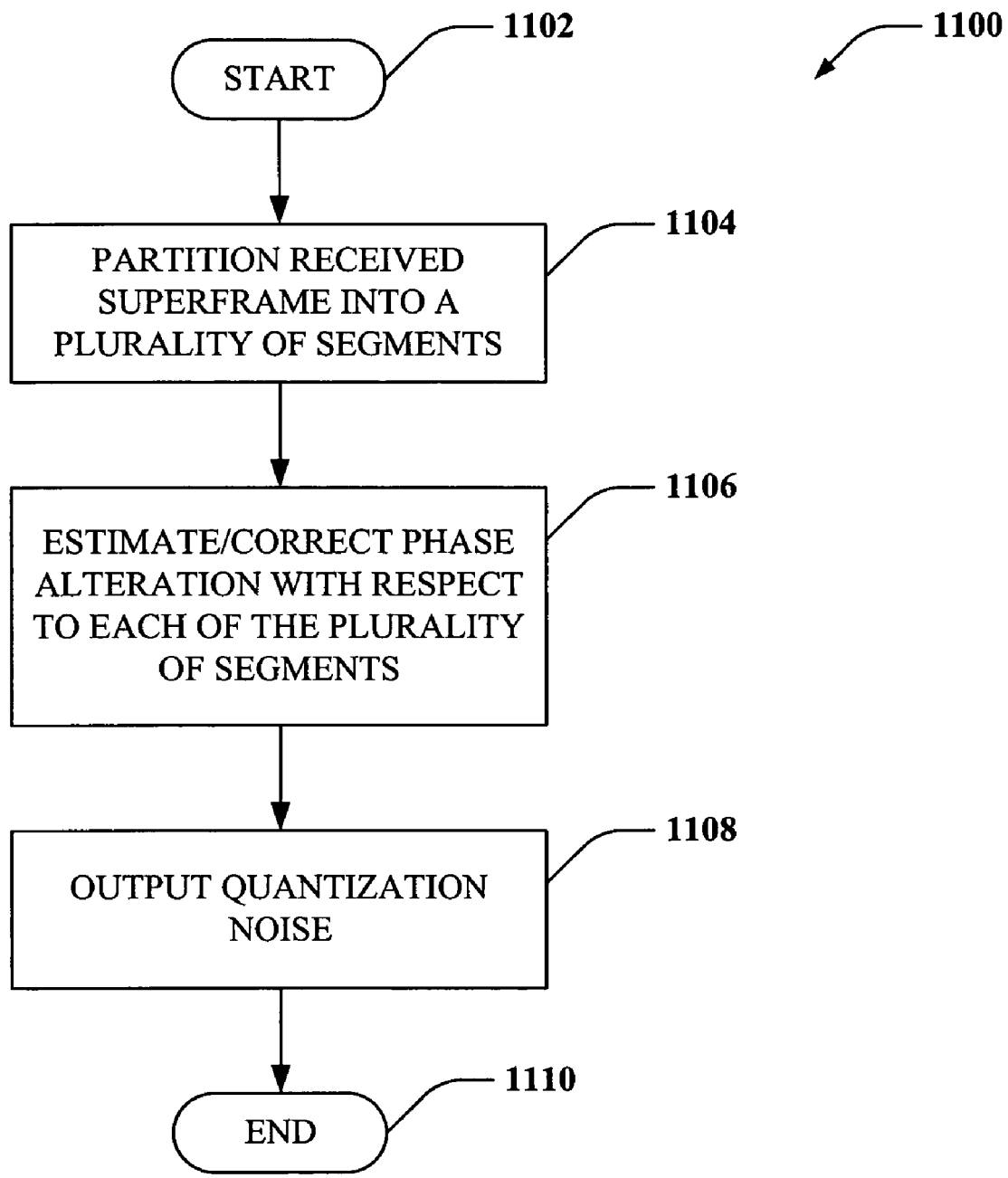
FIG. 11 illustrates a methodology for estimating quantization noise with respect to a signal.

Referring now to FIG. 11, a methodology 1100 that facilitates analyzing transmitter performance is illustrated. The methodology 1100 starts at 1102, and at 1104 a received superframe is partitioned into a plurality of segments. In an example, a superframe can include a plurality of OFDM symbols, which can be received and processed over a particular period of time. Therefore, segmenting a superframe is consistent with partitioning based upon time. The superframe can include any suitable number of symbols, and such superframe can be segmented into any suitable number of segments. A number of segments should not be too great, however, as white Gaussian noise will be cancelled.

At 1106, phase alteration is estimated/corrected with respect to each of the plurality of segments. For instance, phase can be estimated/corrected through utilization of a first order correction algorithm, which can be least squares based. The first order algorithm, however, need not be least squares based, but can be any suitable first order algorithm. Additionally or alternatively, phase of at least one segment can be estimated/corrected by way of employment of a least squares based second order phase estimation/correction algorithm. Such an algorithm was described in detail above. At 1108, quantization noise (white Gaussian noise or additive noise) is output. For example, phase correction by way of segmentation enables nonlinear noise to be substantially cancelled without canceling quantization noise. The amount of quantization noise can be indicative of performance of a FLO transmitter, for instance. The methodology 1100 then completes at 1110.

Figure 12:
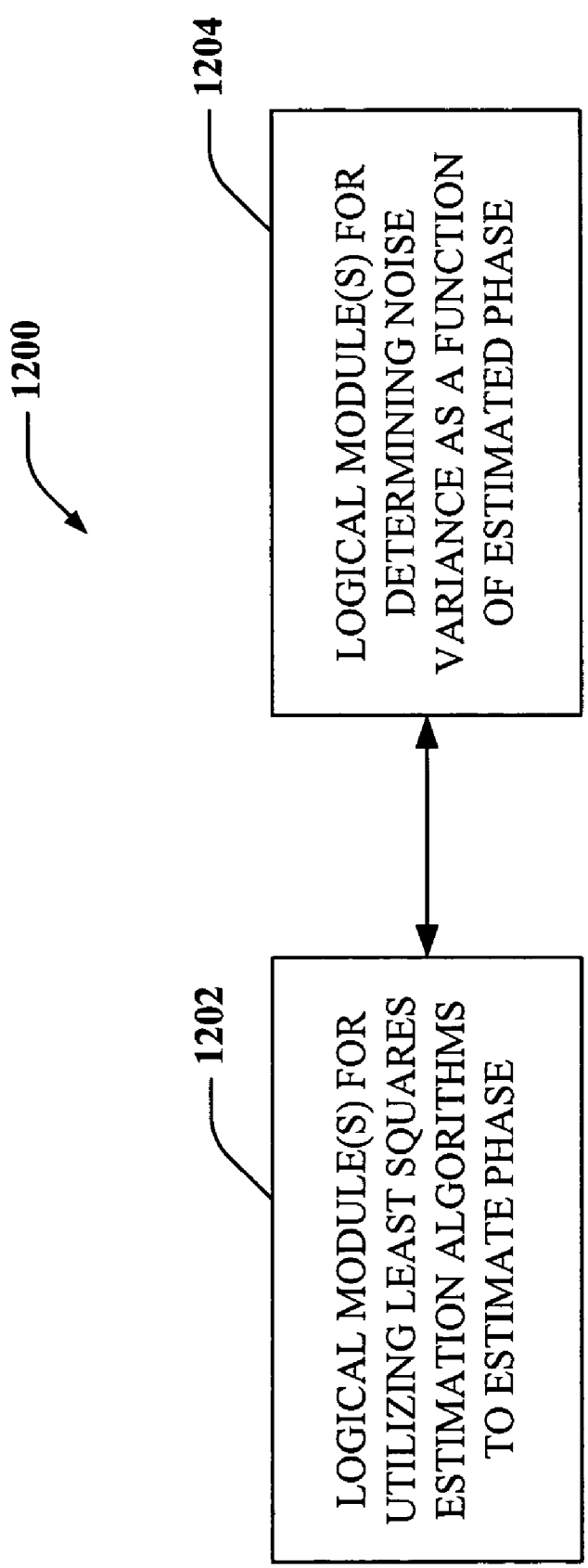
FIG. 12 illustrates a system that facilitates estimating noise variance of a signal.

With reference to FIG. 12, a system 1200 that relates to computing an unbiased estimate of noise variance with respect to a received signal (sample) is illustrated. System 1200 can include logical module(s) for utilizing least squares estimation algorithms to estimate phase related to a received signal 1202, wherein the module(s) 1202 can include a processor, an antenna, a receiver chain, memory, hardware, software, firmware, etc. The estimation undertaken by the module(s) 1200 can be a first order least squares based estimation and/or a second order least squares based estimation. System 1200 can additionally include logical module(s) for computing an estimate of noise variance as a function of the estimated phase 1204. The module(s) 1204 can include memory for retaining algorithm(s) utilized to undertake the computation, processor(s) for executing the algorithm(s), and the like.

Figure 13:
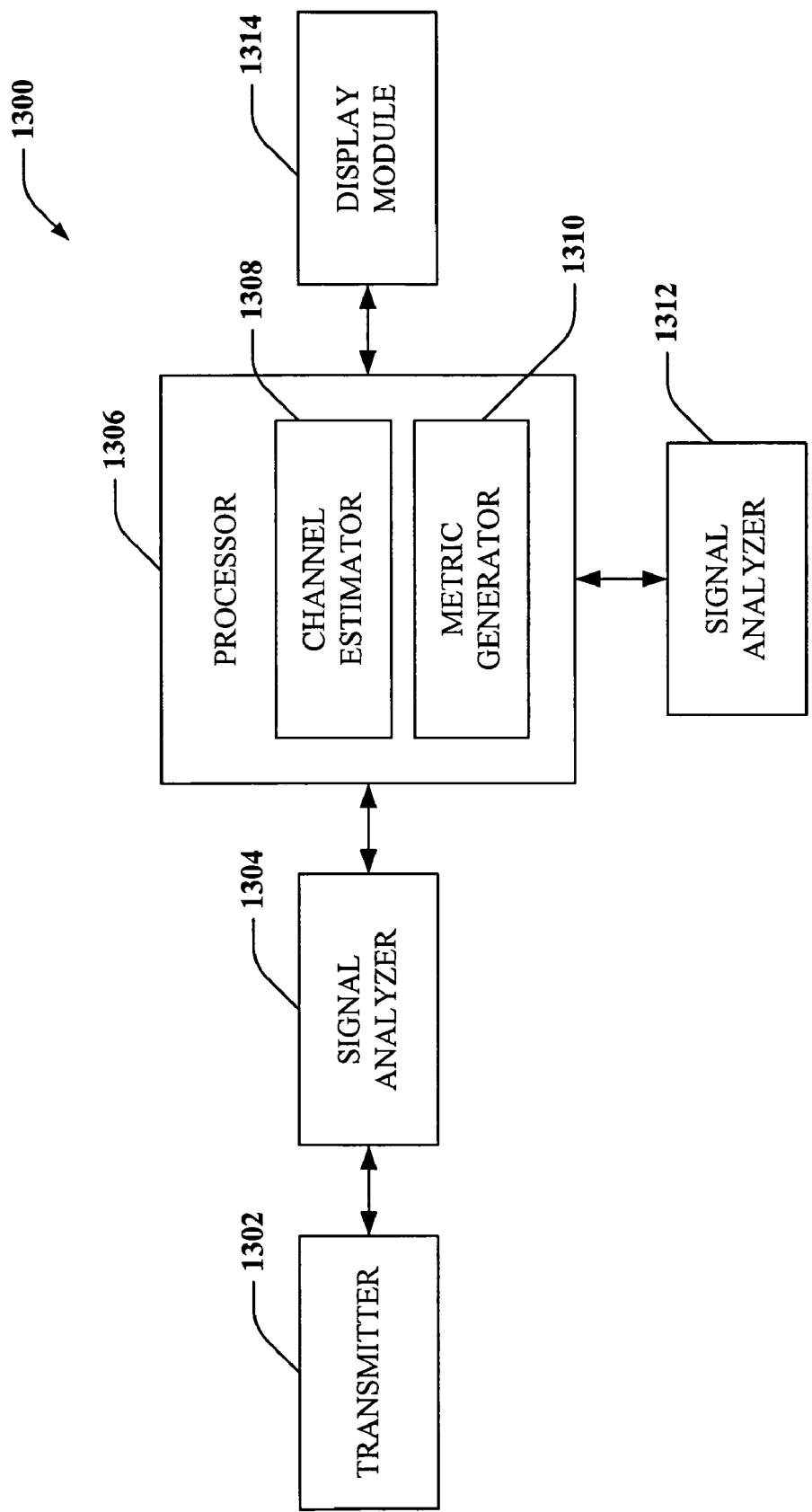
FIG. 13 is an illustration of a transmitter evaluation system.

Referring now to FIG. 13, a transmitter evaluation system 1300 in accordance with various aspects presented herein is illustrated. System 1300 can include a signal analyzer 1304 that can be used to sample a signal generated by a transmitter 1302. By using signal analyzer 1304 rather than a receiver to receive the signal, system 1300 can eliminate the receiver as a possible source of additional noise and distortion. System 1300 can also include a processor 1306 capable of processing the signal captured by signal analyzer 1304 and generating metrics to evaluate the performance of transmitter 1302. Processor 1306 can include a channel estimator 1308 that can be used to generate frequency domain channel estimates for each subcarrier. Processor 1306 can also include a metric generator 1310 that generates a metric, such as the modulation error rate (MER), unbiased estimate of noise variance, etc., to evaluate performance of transmitter 1302. The metric produced by metric generator 1310 can based upon the frequency domain channel estimates produced by channel estimator 1308. System 1300 can also include a memory 1312 connected to processor 1306 that retains data relating to transmitter performance evaluation (e.g., symbol data and metric data). In addition, system 1300 can include a display component 1314 to allow a user to monitor transmitter performance through visual feedback generated by the processor.

Processor 1306 can provide various types of user interfaces for display component 1312. For example, processor 1306 can provide a graphical user interface (GUI), a command line interface and the like. For example, a GUI can be rendered that provides a user with a region to view transmitter information. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed.

In an example, a command line interface can be employed. For example, the command line interface can prompt (e.g., by a text message on a display and an audio tone) the user for information by providing a text message or alert the user that the transmitter performance is outside of predetermined bounds. It is to be appreciated that the command line interface can be employed in connection with a GUI and/or application program interface (API). In addition, the command line interface can be employed in connection with hardware (e.g., video cards) and/or displays (e.g., black and white, and EGA) with limited graphic support, and/or low bandwidth communication channels.

In addition, the evaluation system can generate an alert to notify users if the transmitter performance is outside of an acceptable range. The alert can be audio, visual or any other form intended to attract the attention of a user. The evaluation system can include a predetermined set of values indicating the boundaries of the acceptable range. Alternatively, users may dynamically determine the boundaries. In addition, the evaluation system can generate an alert based upon a change in transmitter performance.

Figure 14:
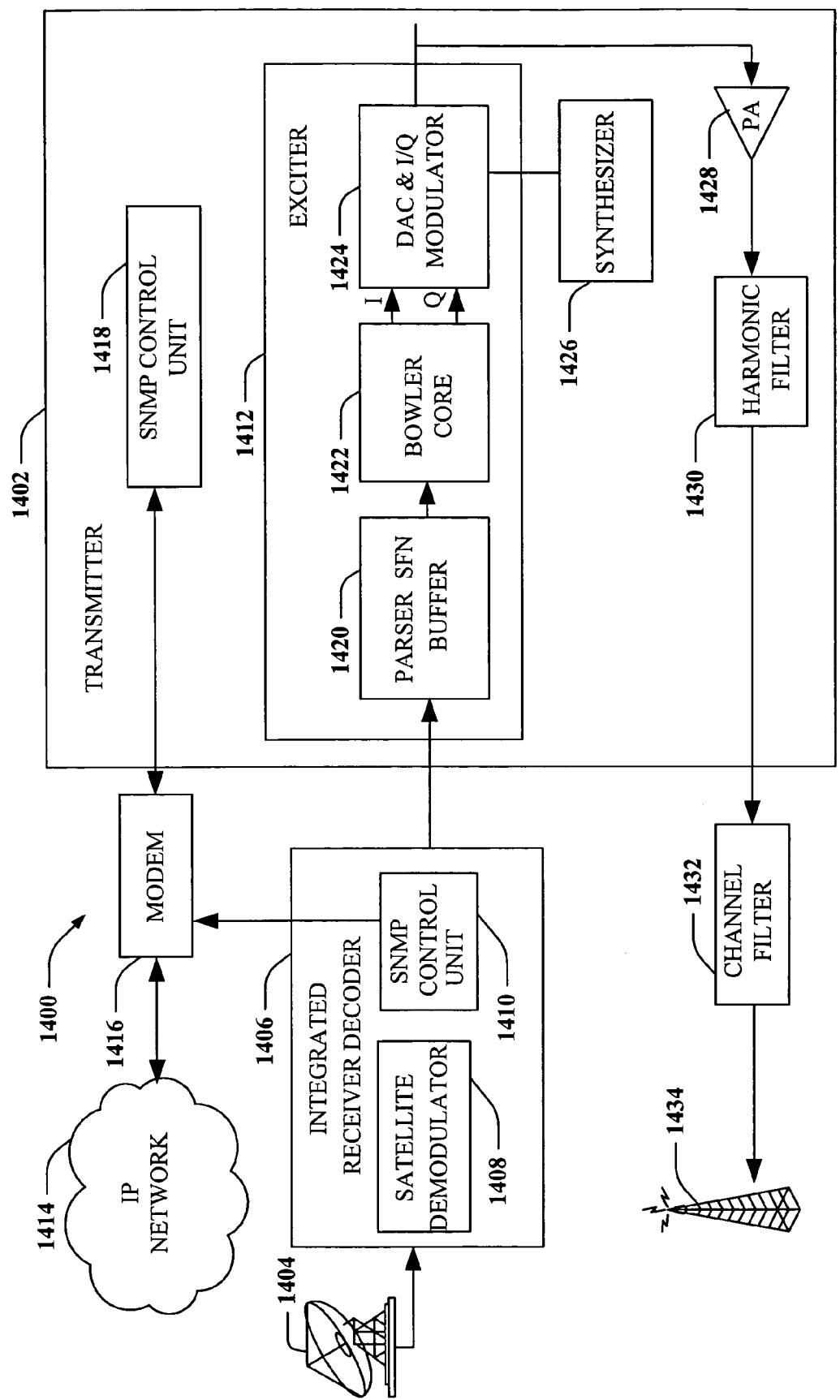
FIG. 14 is an illustration of a wireless communication system.

FIG. 14 is an illustration of a wireless communication system 1400. System 1400 includes a transmitter 1402 that can receive data for transmission from a communication satellite system 1404. Signals from satellite system 1404 can be propagated through an integrated receiver decoder 1406 that can include a satellite demodulator 1408 and a simple network management protocol (SNMP) control unit 1410. Signal data from integrated receiver decoder 1406 can be input into an exciter 1412 within transmitter 1402. In addition, transmitter 1402 can be connected to an Internet provider (IP) network 1414 through a modem 1416. Modem 1416 can be connected to a SNMP control unit 1418 within transmitter 1402. Exciter 1412 can include a parser and single frequency network (SFN) buffer 1420, a bowler core 1422 and a digital to analog converter (DAC) and I/Q modulator 1424. Signal data from satellite system 1404 can be parsed and stored in parser and SFN buffer 1420. Bowler core 1422 generates complex number representing the signal data, passing the signal data to DAC and I/Q modulator 1424 as in-phase (I) and quadrature (Q) components. DAC and I/Q modulator 1424 can utilize a synthesizer 1426 to process the signal data and produce an analog, radio frequency (RF) signal. After the data is converted to analog, the resulting RF signal data can be passed to a power amplifier 1428 and through a harmonic filter 1430. In addition, the data can be passed through a channel filter 1432 prior to transmission by antenna 1434.

To evaluate transmitter performance, the RF signal data produced by exciter 1412 can be monitored. Possible sources of transmitter error or noise include up-sampling, digital to analog conversion and RF conversion. The signal data can be sampled at the output of the exciter and at the output of the channel filter, such that the RF signal can be sampled either before or after power amplification and filtering. If the signal is sampled after amplification, the signal should be corrected for power amplification nonlinearity.

Figure 15:
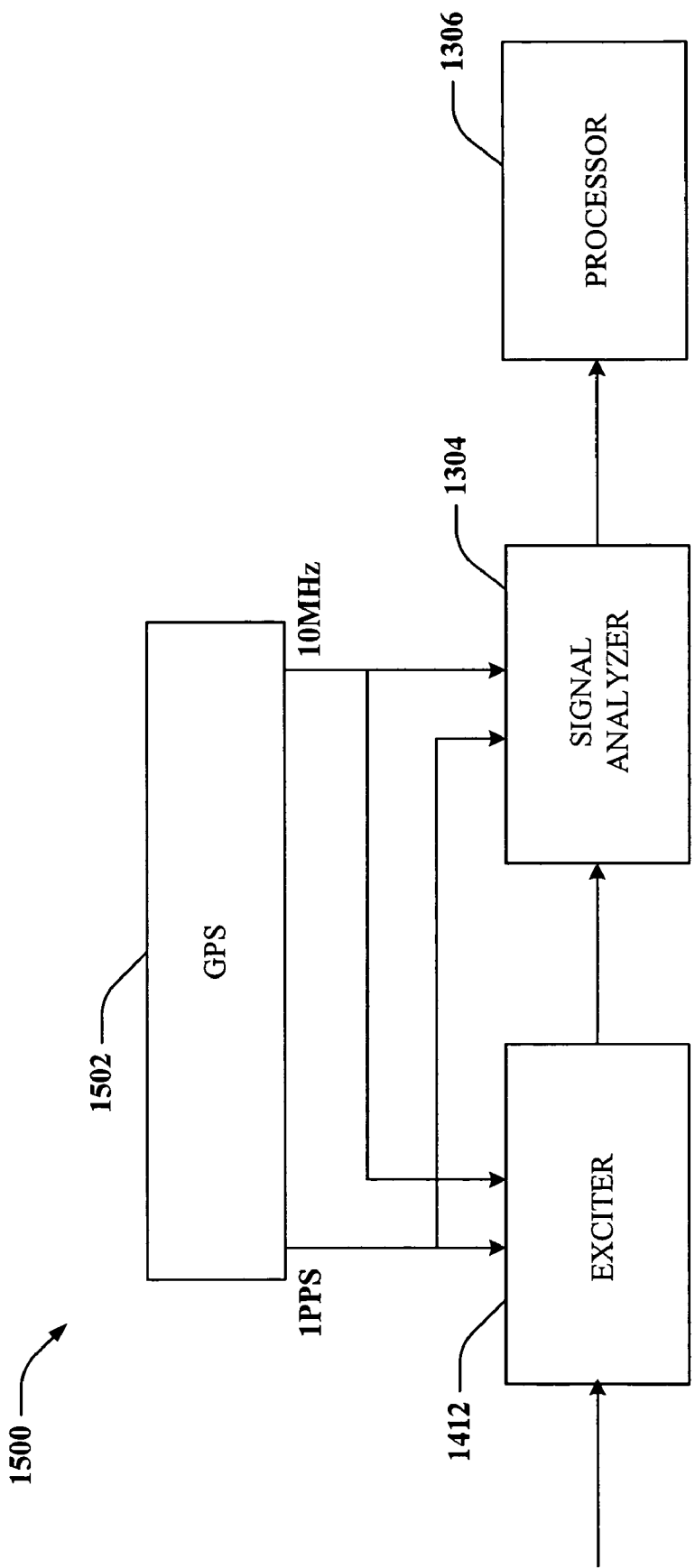
FIG. 15 is an illustration of a transmitter evaluation system.

Referring now to FIG. 15, a transmitter evaluation system 1500 connected to transmitter system exciter 1412 is illustrated. Signals from a global positioning system (GPS) receiver 1502 can be used to synchronize transmitter exciter 1412 and signal analyzer 1304. An external 10 Megahertz clock from GPS receiver 1502 can be fed into both exciter 1412 and signal analyzer 1304 to act as a common clock reference. To synchronize the start of sampling by signal analyzer 1304 to the beginning of the superframe of the RF signal data output by exciter 1412, GPS 1502 can transmit a 1 pulse per second (PPS) signal to exciter 1412 for synchronization and to signal analyzer 1304 to trigger the start of sampling. Signal analyzer 1304 can generate digital samples of exciter analog output waveform at a rate that is synchronous to the baseband chip rate of the transmitted signal. Sampled data is then fed into processor 1306. Processor 1306 can be implemented using a general-purpose processor or a processor dedicated to analyzing transmitter data. Use of a general-purpose processor can reduce the cost of transmitter evaluation system 1500. Signal analyzer 1304 can be configured to run in floating point mode to avoid quantization noise.

Figure 16:
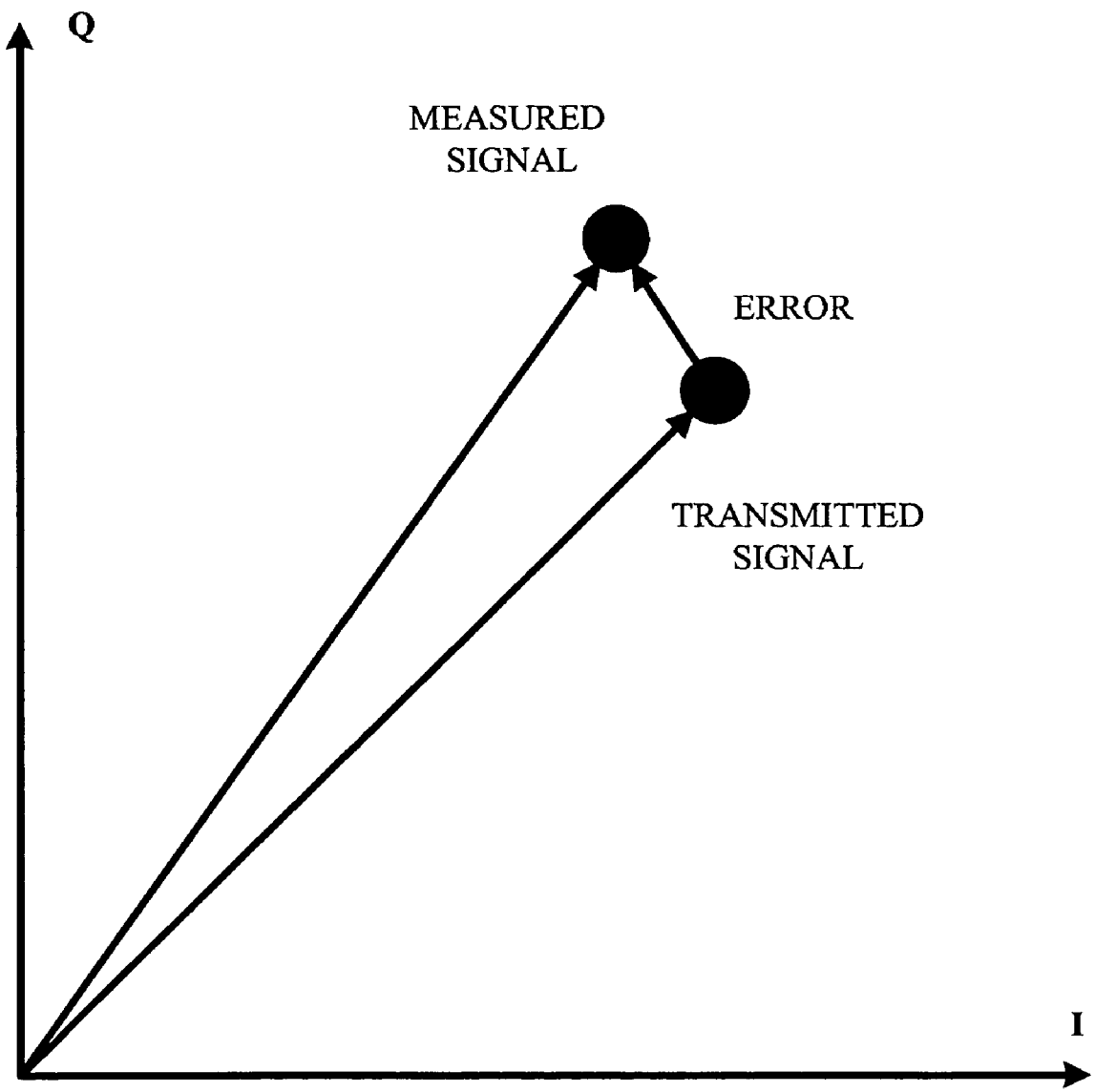
FIG. 16 is a constellation diagram illustrating the difference between a measured signal and a transmitted signal.

Referring now to FIG. 16, a constellation diagram illustrating the difference between measured or received signal and transmitted signal is shown. The axes of the constellation diagram represent the real and imaginary components of complex numbers, referred to as the in phase or I-axis and the quadrature or Q-axis. The vector between the measured signal constellation point and the transmitted signal constellation point represents the error, which can include digital to analog conversion inaccuracies, power amplifier nonlinearities, in-band amplitude ripple, transmitter IFFT quantization error and the like.

The transmitter evaluation system can generate one or more metrics to evaluate the performance of the transmitter. Metrics generated by processor include, but are not limited to, modulation error ratio (MER), group delay or channel frequency response. In particular, MER measures the cumulative impact of flaws within the transmitter. MER for a subcarrier is equivalent to signal to noise ratio (SNR) for a subcarrier. MER can be generated using the following equation:

$$MER(dB) = 10\log \frac{\frac{1}{N}\sum_{1}^{N}(I^2 + Q^2)}{\frac{1}{N}\sum_{1}^{N}(\Delta I^2 + \Delta Q^2)}$$

Here, I is the in phase value of the measured constellation point, Q is the quadrature value of the measured constellation point and N is the number of subcarriers. $\Delta I$ is the difference between the in phase values of the transmitted and measured signals and $\Delta Q$ is the difference between the quadrature values of the transmitted and measured signals.

Figure 17:
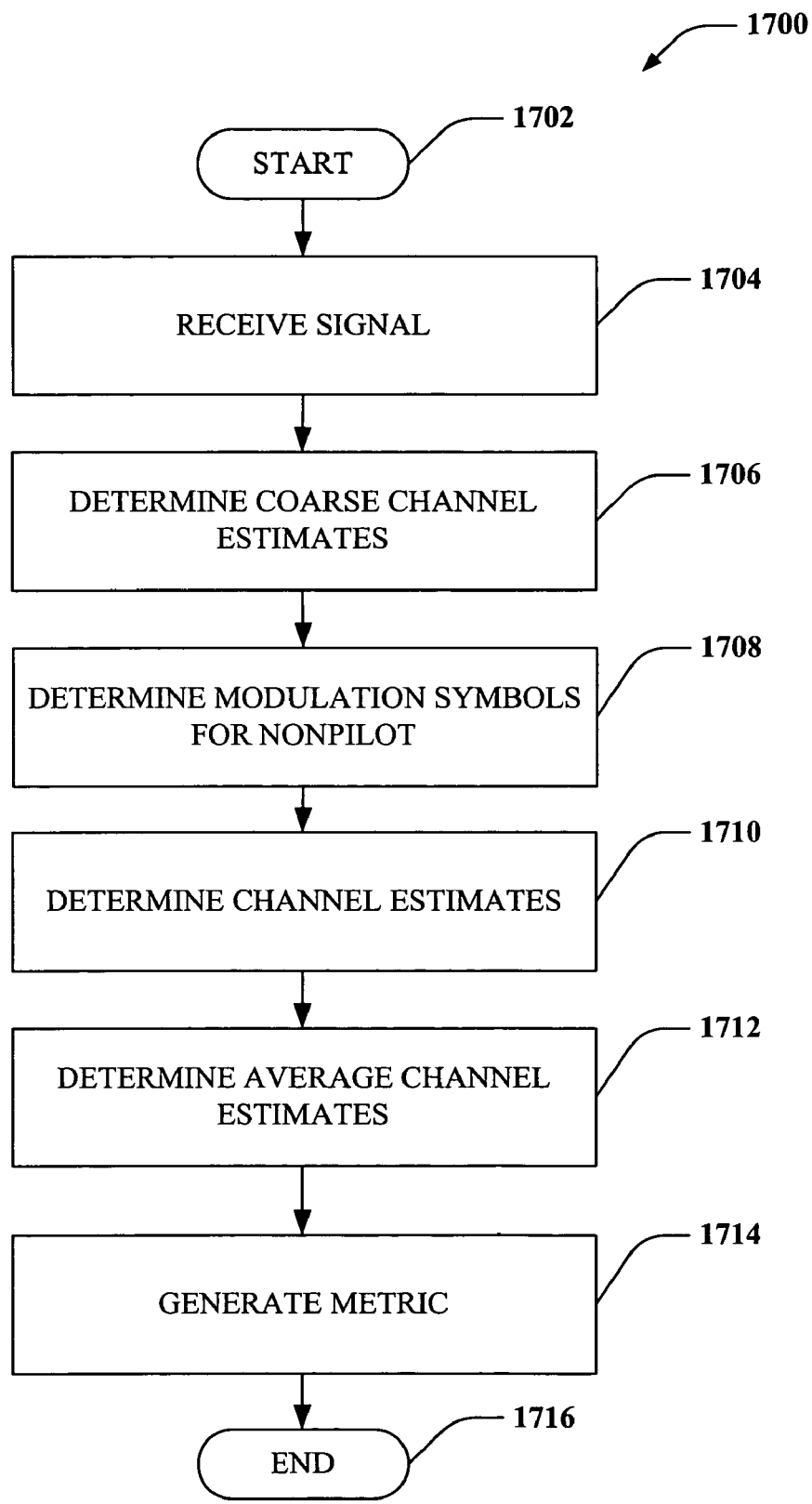
FIG. 17 illustrates a methodology for evaluating a transmitter.

Referring now to FIG. 17, a methodology 1700 for evaluating a transmitter where the transmitted symbols are unknown is illustrated. The modulation symbols (e.g., QPSK or 16QAM symbols) are unknown when real time data streams are transmitted. However, the pilot symbols are known. The methodology 1700 starts at 1702, and at 1704 a signal is received. A coarse initial channel estimation for the subcarriers can be generated at 1706. The coarse initial channel estimation can be performed using the known pilot symbols and linear interpolation and extrapolation, as described with respect to FIG. 18 below. At 1708, the modulation symbols for the subcarriers are determined. The modulation symbols can be determined using a constellation diagram as described below with respect to FIGS. 19 and 20. The symbols can be selected based upon the distance between the received signal constellation point and the modulation symbol corresponding to the closest symbol constellation point. Symbol selection is described in further detail below. At 1710, an initial frequency domain channel estimate for each subcarrier can be determined. An initial channel estimate for each subcarrier can be obtained by dividing the received signal by the modulation symbol.

At 1712, the channel estimates are averaged over the superframe to increase accuracy. The average channel estimate can be determined using the coarse channel estimates, the channel estimates based upon the modulation symbols or both sets of channel estimates. A metric for evaluating the transmitter based at least in part upon the channel estimates can be generated at 1714. For example, the MER for each subcarrier can be determined based upon the channel estimates and the modulation symbol, as described in detail above. The methodology 1700 then completes at 1716.

Figure 18:
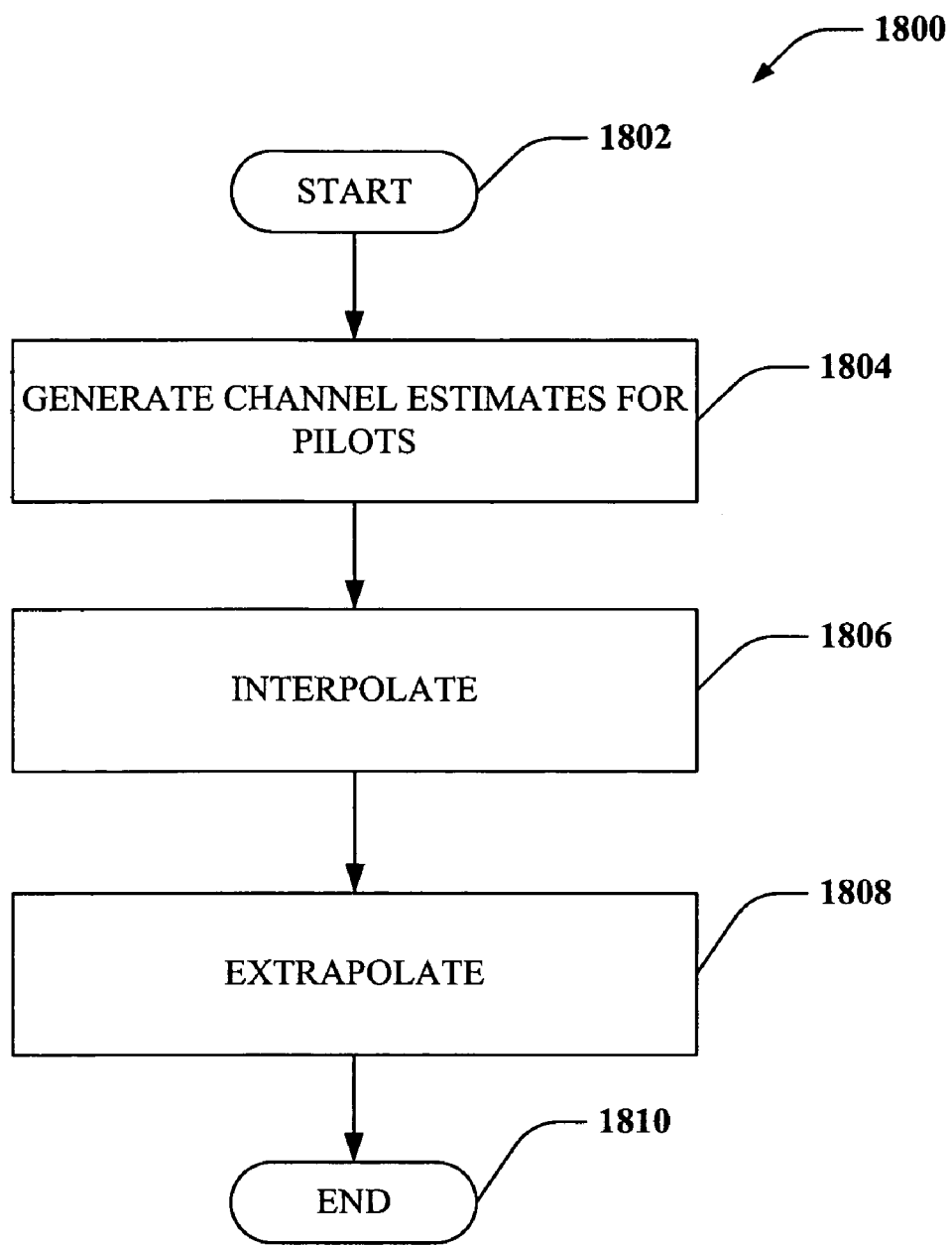
FIG. 18 illustrates a methodology for generating coarse channel estimates.

Referring now to FIG. 18, a methodology 1800 for generating coarse channel estimates is illustrated. The methodology 1800 initiates at 1802. As discussed in detail above, the received signal can be written as a function of the channel estimate, the symbol for the subcarrier and a noise term, AWGN. In each OFDM symbol, there are a predetermined number of subcarriers carrying pilot symbols known to the receiver, (e.g., 500 subcarriers carrying pilot QPSK symbols). Therefore, the modulation symbols are known for this subset of subcarriers. Consequently, at 1804 the channel estimates can be calculated for the pilot subcarriers. At 1806, the channel estimates for subcarriers located between two pilot subcarriers can be obtained using linear interpolation. At 1808, the channel estimates for subcarriers at the ends of the superframe, and consequently not located between pilot subcarriers, can be obtained using linear extrapolation.

In addition, since there is (2, 6) pattern staggering of pilot symbols for the OFDM symbols of a superframe, both the 500 pilots of the current OFDM symbol and the 500 pilots of the previous OFDM symbol can be used to obtain the frequency domain channel estimation. In such cases, the channel estimates of the pilot subcarriers are generated using the pilot symbols and the channel estimates of the rest of the subcarriers are obtained by linear interpolation or extrapolation. The methodology 1800 completes at 1810.

Figure 19:
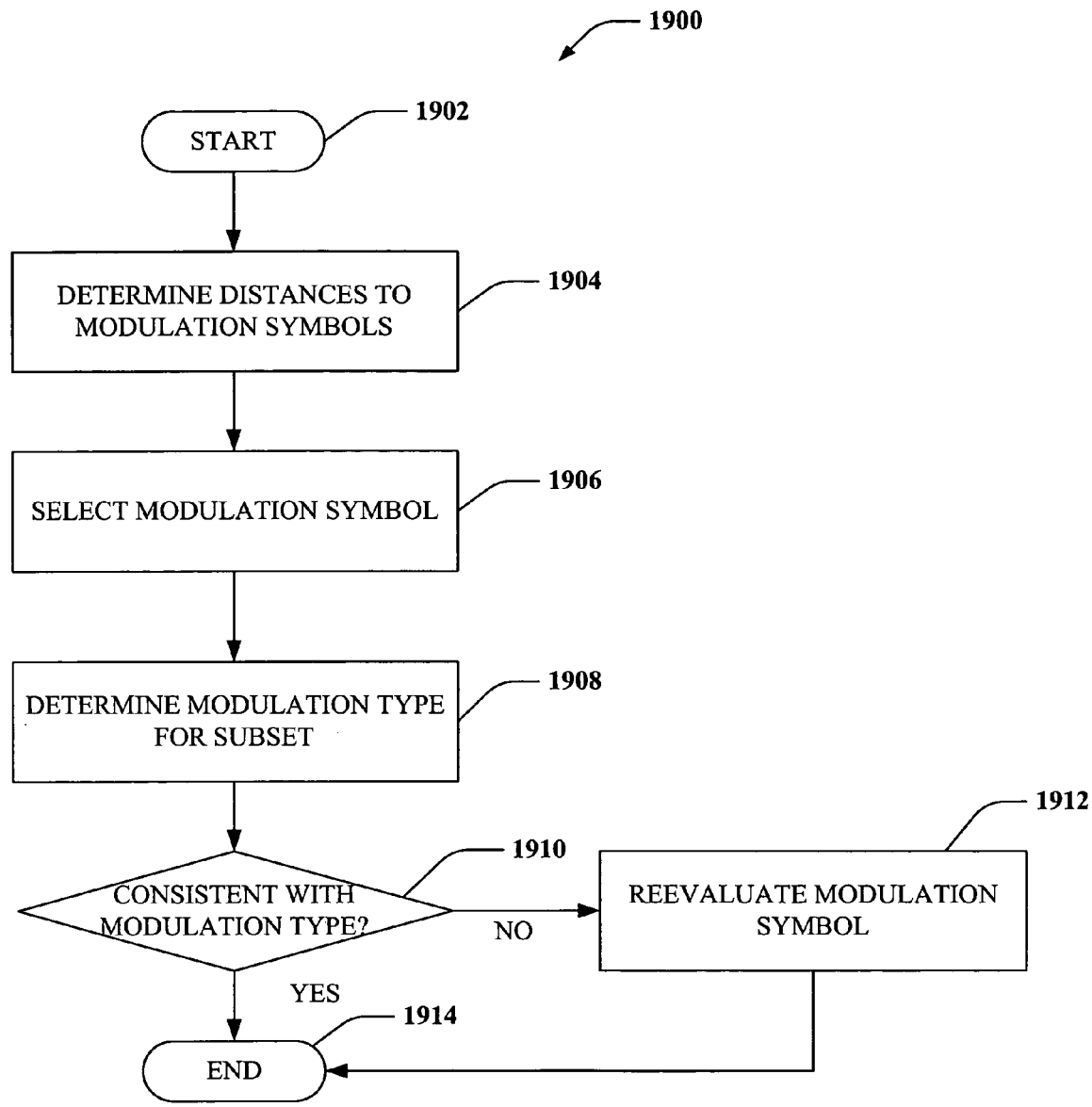
FIG. 19 illustrates a methodology for determining modulation symbols.

Referring now to FIG. 19, a methodology 1900 for determining modulation symbol is illustrated. The methodology 1900 starts at 1902, and at 1904 the distances between the constellation point of the received signal and the constellation points of possible modulation symbols are calculated. For example, the distance between the received signal constellation point and the QPSK constellation point closest the signal constellation point, as well as the distance between the signal constellation point and the 16QAM constellation point closest to the signal constellation point can be calculated. At 1906, the modulation symbol constellation point closest to the signal constellation point is selected as the modulation symbol. To increase accuracy in selection of modulation symbols, the modulation symbol can be compared to the modulation type for a subset of the subcarriers having a consistent modulation type. A half-interlace is used herein as an example of a subset of subcarriers having a consistent modulation type. However, in the systems and methods discussed herein, the subset of subcarriers having a consistent modulation type is not limited to a half-interlace. Errors in modulation symbol selection can be avoided by checking the modulation symbol for a subcarrier against the modulation type for the subset of subcarriers. The modulation type for the subset of subcarriers can be determined at 1908. At 1910, it is determined whether the modulation symbol is consistent with the modulation type. If yes, the process terminates. If no, the modulation symbol is reevaluated and a modulation symbol consistent with the modulation type is selected at 1912.

Typically, the modulation type remains consistent during a half interlace. In general, the modulation type does not change within an interlace due to constraints in the FLO protocol. An interlace, as used herein is a set of subcarriers (e.g., 500 subcarriers). Consequently, a half-interlace is one half of an interlace (e.g., 250 subcarriers). However, for rate-⅔ layered modulation, the modulation type can be switched to QPSK within an interlace when operating in base-layer only mode. Even under these conditions the modulation type within each half-interlace remains constant. Therefore, the modulation type for each half-interlace can be determined using majority voting. To determine the modulation type for a half-interlace or any other subset of subcarriers having a consistent modulation type, the modulation symbol, and consequently the modulation type, can be determined for each subcarrier within the subset. A majority vote based on the modulation type corresponding to each subcarrier can be used to determine the modulation type for the subset. For example, for a half-interlace including 250 subcarriers, the modulation type for 198 of the subcarriers could be consistent with the QPSK modulation type and the modulation symbols for the remaining 52 subcarriers could be consistent with the 16QAM modulation type. Since the majority of the subcarriers are detected as QPSK, QPSK would be selected as the modulation type for the half-interlace. The 52 subcarriers that were associated with the 16QAM modulation type can be reevaluated and reassigned to QPSK modulation symbols based upon their location in the constellation diagram. Comparing the modulation symbol to the modulation type for the half-interlace and reevaluating modulation symbols as needed increases the accuracy of modulation symbol selection. The methodology 1900 completes at 1914.

Figure 20:
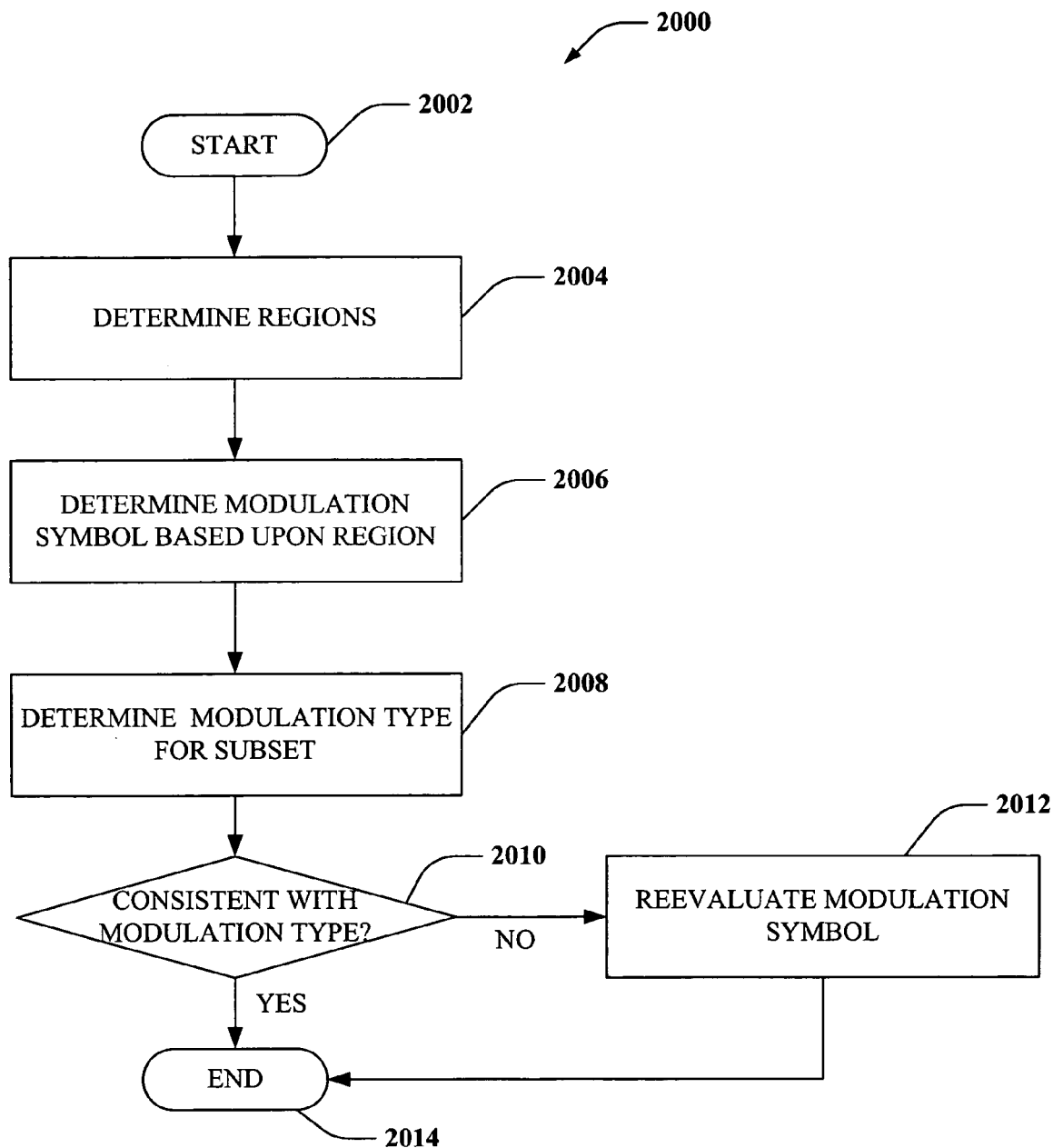
FIG. 20 illustrates a methodology for determining modulation symbols.
Figure 21:
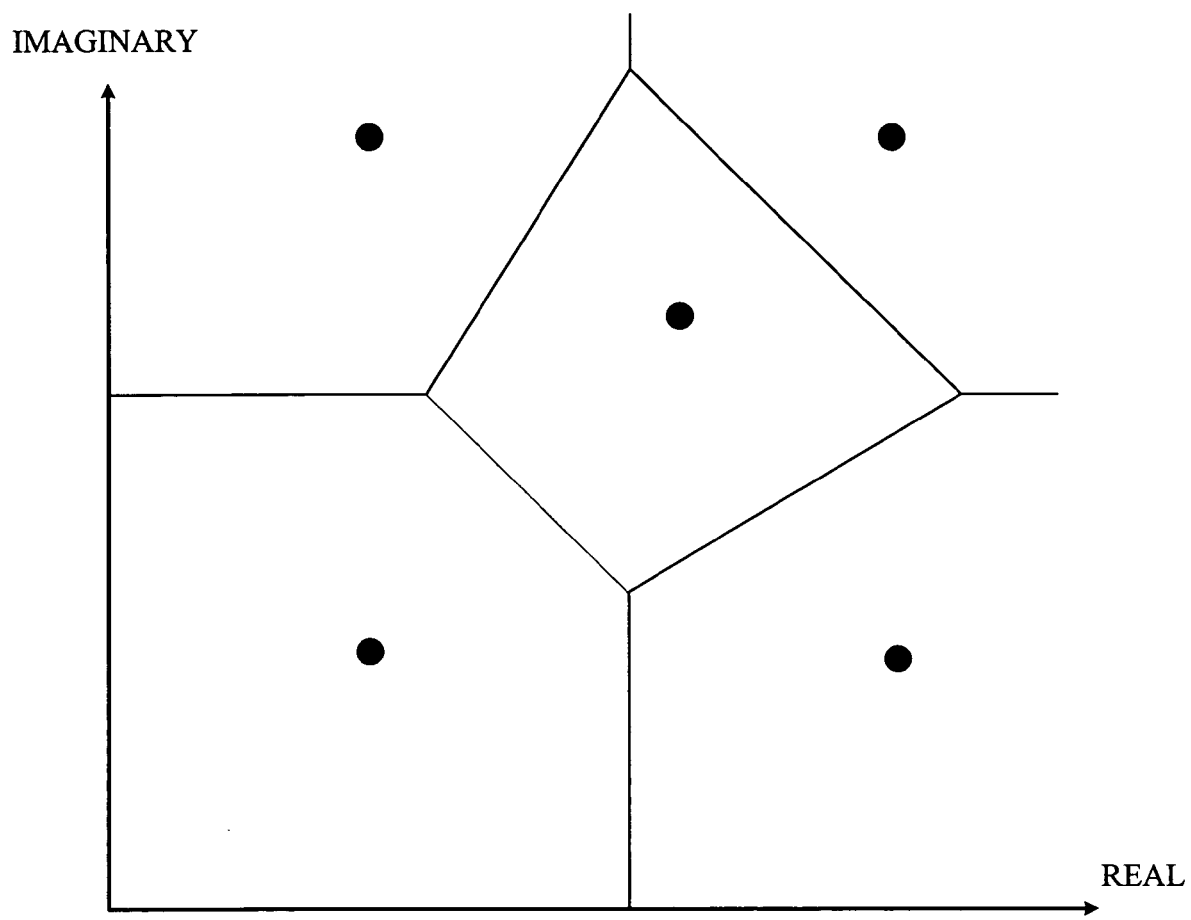
FIG. 21 illustrates the division of a constellation diagram into regions.

Referring now to FIG. 20, a methodology 2000 for determining modulation symbols is illustrated. The methodology 2000 starts at 2002, and at 2004 a constellation diagram including constellation points representing various modulation symbols is divided into a series of regions. Each region is associated with a modulation symbol constellation point. Regions are defined such that every point in each region has the property that the distance of such a point to the constellation point of the region is less than or equal to the distance between such point to the constellation point of any other region. A set of regions covering the first quadrant of the constellation diagram is illustrated in FIG. 21. At 2106, the region in which the received signal constellation point is located is determined. The modulation symbol corresponding to the region in which the received signal constellation point is located is selected as the modulation symbol. The modulation symbol can be checked against the modulation type for a subset of subcarriers having a consistent modulation type (e.g., a half-interlace). The modulation type for the subset of subcarriers can be determined at 2008. At 2010, it is determined whether the modulation symbol is consistent with the modulation type. If yes, the process terminates. If no, the modulation symbol is reevaluated and a modulation symbol consistent with the modulation type is selected at 2012.

The transmitter evaluation systems and methods described herein should also include phase correction, intended to reduce or eliminate error or distortions caused by time frequency offsets. If phase correction is not performed, the channel estimate average can be inaccurate and consequently, the evaluation metrics may be incorrect. Typically, phase correction can be performed prior to the averaging of the channel estimates to correct for phase ramp due to frequency offsets. The methodology 2000 completes at 2014.

Figure 22:
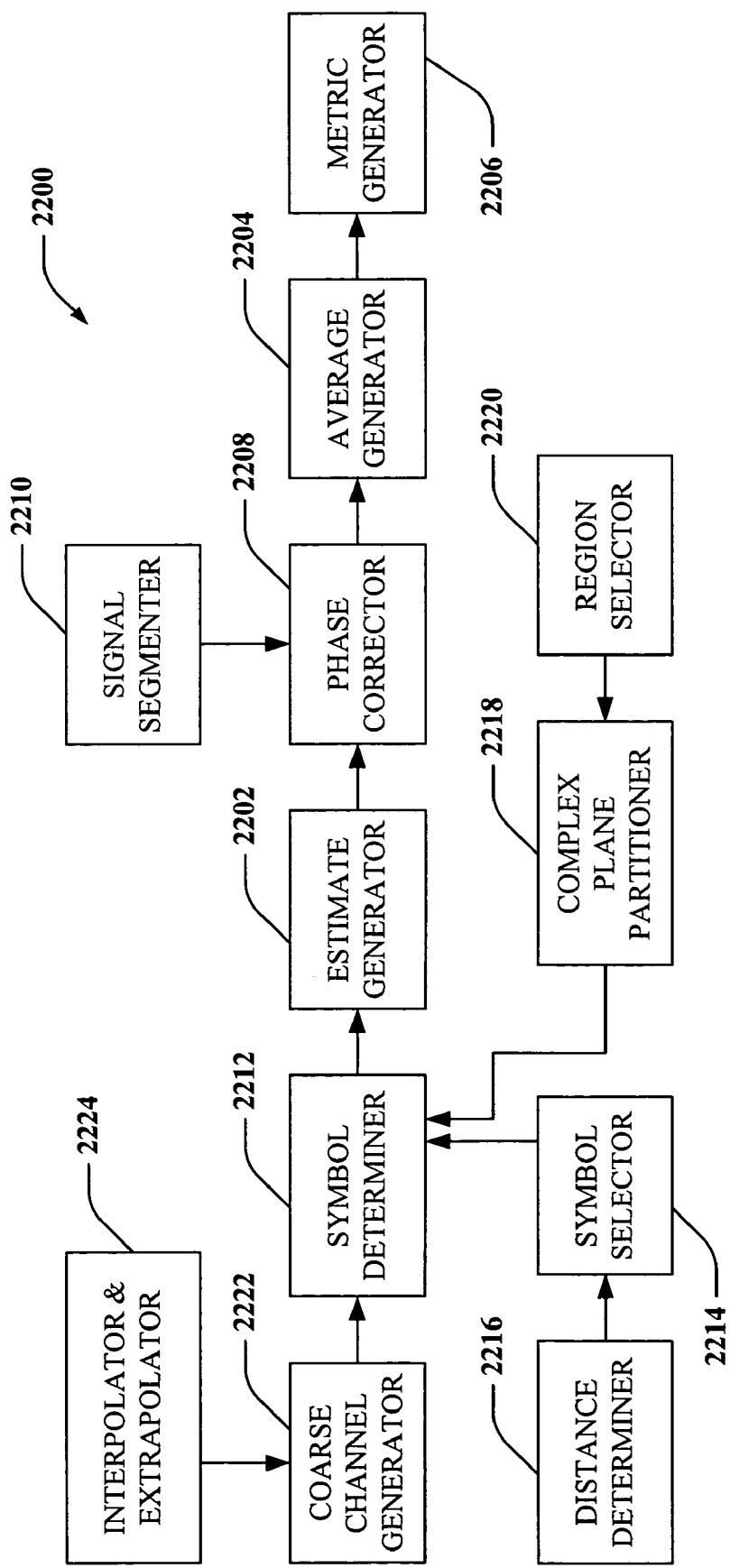
FIG. 22 is an illustration of a system that evaluates transmitter performance in a wireless communication environment.

Referring now to FIG. 22, a system 2200 for evaluating transmitter performance in a wireless communication environment in accordance with one or more aspects presented herein is illustrated. System 2200 includes a channel estimate generator 2202 that generates frequency domain channel estimates for subcarriers, an average generator 2204 that calculates the average channel estimate for a subcarrier and a metric generator 2206 that generates a metric, such as MER, used to evaluate transmitter performance. System 2200 can also include a phase corrector 2208 that corrects for phase ramp caused by frequency offset. The signal may be separated into segments by a signal segmenter 2210 for phase correction. In addition, system 2200 can include a symbol determiner 2212 that determines modulation symbols for the subcarriers. The symbols may be selected by a symbol selector 2214 based upon the distance between the received signal and modulation symbols in a complex plane as determined by a distance determiner 2216. Alternatively, the complex plane can be partitioned into regions by a complex plane partitioner 2218 and the region in which the received signal is located can be selected by a region selector 2220 and used to determine the symbol. Furthermore, system 2200 can include a coarse channel generator 2222 that generates coarse channel estimates. An interpolator and extrapolator 2224 can be used to generate the coarse channel estimates.

Figure 23:
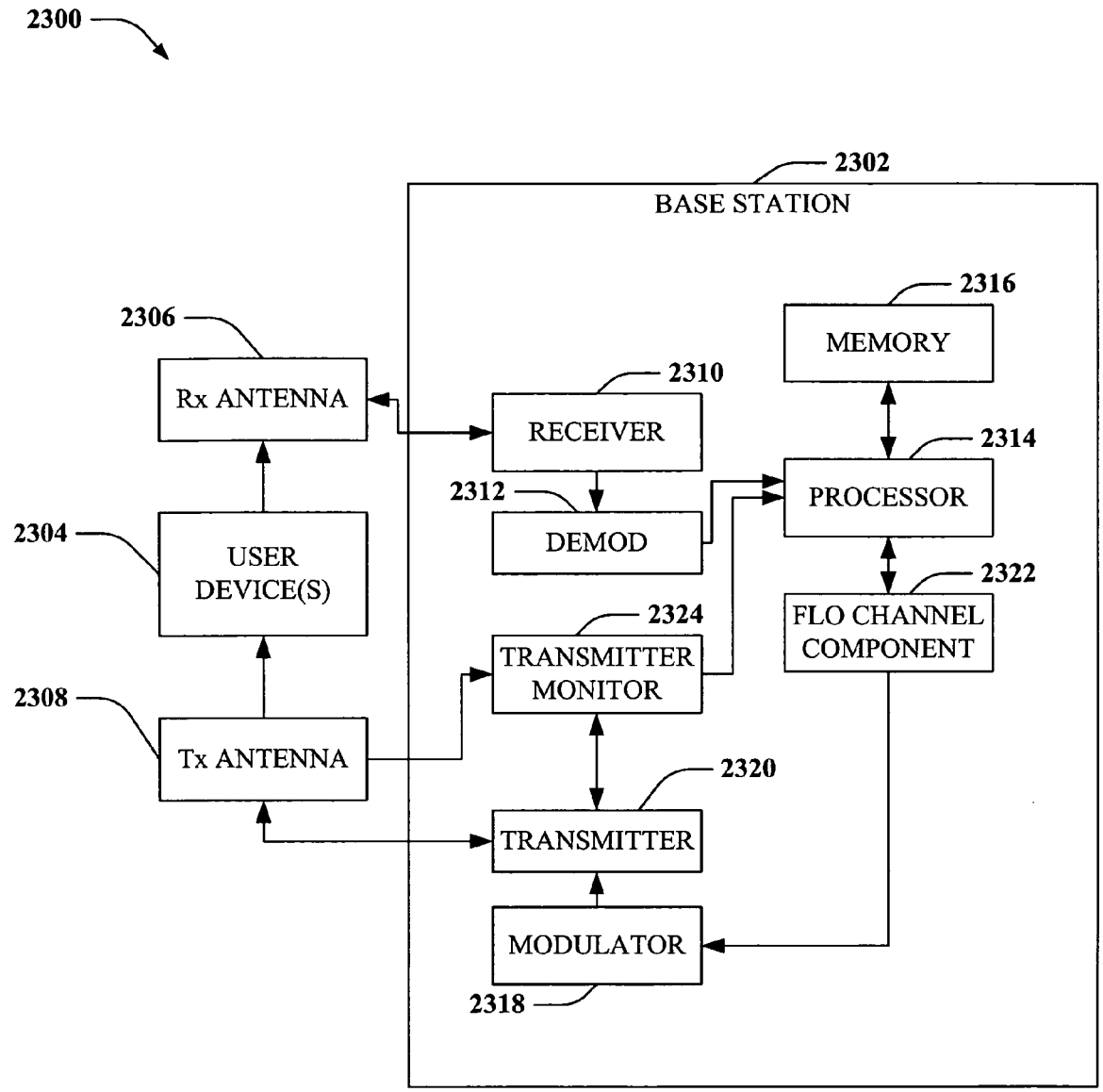
FIG. 23 illustrates an example base station.

FIG. 23 is an illustration of a system 2300 that provides for monitoring transmitter performance in a communication environment. System 2300 comprises a base station 2302 with a receiver 2310 that receives signal(s) from one or more user devices 2304 via one or more receive antennas 2306, and transmits to the one or more user devices 2304 through one or more transmit antennas 2308. In one or more embodiments, receive antennas 2306 and transmit antennas 2308 can be implemented using a single set of antennas. Receiver 2310 can receive information from receive antennas 2306 and is operatively associated with a demodulator 2312 that demodulates received information. Receiver 2310 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 2314. Processor 2314 can be a processor dedicated to analyzing information received by receiver component 2314 and/or generating information for transmission by a transmitter 2314. Processor 2314 can be a processor that controls one or more components of base station 2302, and/or a processor that analyzes information received by receiver 2310, generates information for transmission by a transmitter 2320, and controls one or more components of base station 2302. Receiver output for each antenna can be jointly processed by receiver 2310 and/or processor 2314. A modulator 2318 can multiplex the signal for transmission by a transmitter 2320 through transmit antennas 2308 to user devices 2304. Processor 2314 can be coupled to a FLO channel component 2322 that can facilitate processing FLO information associated with one or more respective user devices 2304.

Base station 2302 can also include a transmitter monitor 2324. Transmitter monitor 2324 can sample transmitter output and/or transmitter antenna output and evaluate the performance of transmitter 2320. Transmitter monitor 2324 can be coupled to processor 2314. Alternatively, transmitter monitor 2324 can include a separate processor for processing transmitter output. In addition, transmitter monitor 2324 may be independent of base station 2302.

Base station 2302 can additionally comprise memory 2316 that is operatively coupled to processor 2314 and that can store information related to constellation regions and/or any other suitable information related to performing the various actions and functions set forth herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1516 of the subject systems and methods is intended to comprise, without being limited to, these and any other suitable types of memory.

Figure 24:
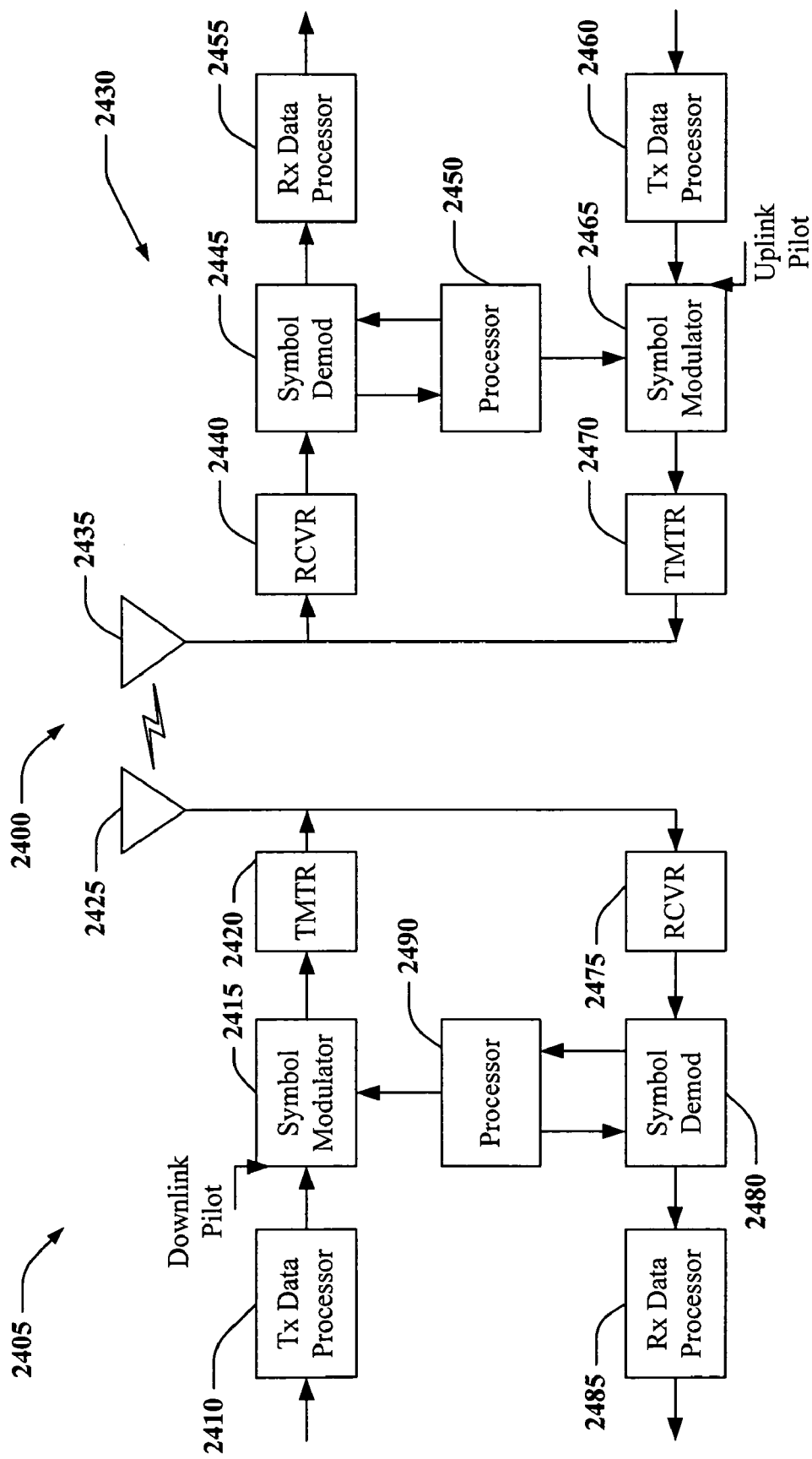
FIG. 24 is an illustration of a wireless communication environment that can be employed in conjunction with the various systems and methods described herein.

FIG. 24 shows an example wireless communication system 2400. The wireless communication system 2400 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein.

Referring now to FIG. 24, on a downlink, at access point 2405, a transmit (TX) data processor 2410 receives, formats, codes, interleaves, and modulates (or symbol maps) traffic data and provides modulation symbols ("data symbols"). A symbol modulator 2415 receives and processes the data symbols and pilot symbols and provides a stream of symbols. Symbol modulator 2415 multiplexes data and pilot symbols and provides them to a transmitter unit (TMTR) 2420. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 2420 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 2425 to the user devices. At user device 2430, an antenna 2435 receives the downlink signal and provides a received signal to a receiver unit (RCVR) 2440. Receiver unit 2440 conditions (e.g., filters, amplifies, and frequency downconverts) the received signal and digitizes the conditioned signal to obtain samples. A symbol demodulator 2445 demodulates and provides received pilot symbols to a processor 2450 for channel estimation. Symbol demodulator 2445 further receives a frequency response estimate for the downlink from processor 2450, performs data demodulation on the received data symbols to obtain data symbol estimates (which are estimates of the transmitted data symbols), and provides the data symbol estimates to an RX data processor 2455, which demodulates (e.g., symbol demaps), deinterleaves, and decodes the data symbol estimates to recover the transmitted traffic data. The processing by symbol demodulator 2445 and RX data processor 2455 is complementary to the processing by symbol modulator 2415 and TX data processor 2410, respectively, at access point 2405.

On the uplink, a TX data processor 2460 processes traffic data and provides data symbols. A symbol modulator 2465 receives and multiplexes the data symbols with pilot symbols, performs modulation, and provides a stream of symbols. A transmitter unit 2470 then receives and processes the stream of symbols to generate an uplink signal, which is transmitted by the antenna 2435 to the access point 2405.

At access point 2405, the uplink signal from user device 2430 is received by the antenna 2425 and processed by a receiver unit 2475 to obtain samples. A symbol demodulator 2480 then processes the samples and provides received pilot symbols and data symbol estimates for the uplink. An RX data processor 2485 processes the data symbol estimates to recover the traffic data transmitted by user device 2430. A processor 2490 performs channel estimation for each active user device transmitting on the uplink. Multiple user devices may transmit pilot concurrently on the uplink on their respective assigned sets of pilot subcarriers, where the pilot subcarrier sets may be interlaced.

Processors 2490 and 2450 direct (e.g., control, coordinate, manage, etc.) operation at access point 2405 and user device 2430, respectively. Respective processors 2490 and 2450 can be associated with memory units (not shown) that store program codes and data. Processors 2490 and 2450 can utilize any of the methodologies described herein. Respective Processors 2490 and 2450 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for estimating noise variance associated with a transmitter, comprising:
   estimating, using a processor, phase alteration of a received signal through utilization of a least squares based phase estimation algorithm;
   determining, using the processor, an unbiased estimate of noise variance as a function of the estimated phase alteration; and
   calculating from the unbiased estimate of noise variance, using the processor, a modulation error ratio comprising only interference caused by imperfections of a transmitter.

2. The method of claim 1, wherein the least squares based algorithm is a first order algorithm.

3. The method of claim 1, wherein the least squares based algorithm is a second order algorithm.

4. The method of claim 1, wherein estimating phase alteration comprises:
   segmenting the received signal into a plurality of portions; and
   estimating phase alteration for each of the plurality of portions.

5. The method of claim 1, wherein the unbiased estimate of noise variance is determined through employment of the following algorithm:

$$\sigma\hat{}_{zk}^2 = \beta \sum_{n=0}^{N-1} |r_k''(n) - \hat{h}_k|^2,$$

where $\hat{\sigma}_{z_k}$ is the unbiased estimate with respect to a particular subcarrier k, .beta. is a scaling factor, N is a number of symbols in the received signal, and r".sub.k(n) and h.sub.k are in-phase and quadrature components of noise, respectively.

6. The method of claim 5, wherein .beta.=1 N−1.5.

7. The method of claim 5, wherein the received signal has been partitioned into a plurality of segments, each of the segments includes K symbols.

8. The method of claim 7, wherein .beta.=1 N−1.5−K and the least squares based algorithm is a first order algorithm.

9. The method of claim 7, wherein .beta.=1 N−0.5−1.5 K and the least squares based algorithm is a second order algorithm.

10. The method of claim 1, further determining MER based at least in part upon the determined estimate of noise variance.

11. A receiver configured to perform the method of claim 1.

12. A communications apparatus, comprising:
a memory that retains instructions for:
estimating phase alteration over time with respect to a received signal through employment of a least squares based phase estimation algorithm;
de-estimating noise variance of the received signal based at least in part upon the estimated phase alteration, wherein the noise variance de-estimation is calculated from a modulation error ratio comprising only interference caused by imperfections of a transmitter; and
a processor that is configured to execute the instructions retained within the memory.

13. The communications apparatus of claim 12 being a FLO receiver.

14. The communications apparatus of claim 12, wherein the least squares based phase estimation algorithm is a first order least squares based phase estimation algorithm.

15. The communications apparatus of claim 12, wherein the least squares based phase estimation algorithm is a second order least squares based phase estimation algorithm.

16. The communications apparatus of claim 12, the memory retains additional instructions for segmenting the received signal into a plurality of segments and estimating phase alteration with respect to at least one of the segments, wherein the processor is configured to execute the additional instructions.

17. The communications apparatus of claim 16, wherein each of the plurality of segments include a substantially similar number of symbols.

18. The communications apparatus of claim 12, wherein the processor executes the following algorithm in connection with estimating noise variance:

$$\hat{\sigma}_{zk}^2 = \beta . n=0N-1 r k''(n) - h k2,$$

where $\hat{\phi}_{z_k}$ is the estimated noise variance with respect to a particular subcarrier k, .beta. is a scaling factor, N is a number of symbols in the received signal, and r".sub.k(n) and h.sub.k are in-phase and quadrature components of noise, respectively.

19. The communications apparatus of claim 18, wherein .beta.=1 N−0.5−K, where K is a number of symbols within a segment of the received signal and the least squares based phase estimation algorithm is a first order phase estimation algorithm.

20. The communications apparatus of claim 18, wherein .beta.=1 N−0.5−1.5 K, where K is a number of symbols within a segment of the received signal and the least squares based phase estimation algorithm is a second order phase estimation algorithm.

21. A communications apparatus, comprising:
means for estimating phase alteration associated with a received signal through employment of a least squares based phase estimation algorithm;
means for determining an unbiased estimate of noise variance with respect to the received signal as a function of the estimated phase alteration and
means for calculating from the unbiased estimate of noise variance, a modulation error ratio comprising only interference caused by imperfections of a transmitter.

22. The communications apparatus of claim 21, further comprising means for partitioning the received signal into a plurality of segments, wherein each of the plurality of segments includes a substantially similar number of symbols.

23. The communications apparatus of claim 21 being a FLO receiver.

24. The communications apparatus of claim 21, wherein the means for determining the unbiased estimate comprises means for executing the following algorithm:

$$\hat{\sigma}_{zk}^2 = \beta . n=0N-1 r k''(n) - h k2,$$

where $\hat{\phi}_{z_j}$ is the unbiased estimate with respect to a subcarrier k, .beta. is a scaling factor, N is a number of symbols in the received signal, and r".sub.k(n) and h.sub.k are in-phase and quadrature components of noise, respectively.

25. The communications apparatus of claim 24, wherein .beta.=1 N−0.5−K, where K is a number of symbols within a segment of the received signal and the least squares based phase estimation algorithm is a first order algorithm.

26. The communications apparatus of claim 24, wherein .beta.=1 N−0.5−1.5 K, where K is a number of symbols within a segment of the received signal and the least squares based phase estimation algorithm is a second order algorithm.

27. The communications apparatus of claim 21, further comprising means for estimating MER as a function of the unbiased estimate of noise variance.

28. A machine-readable medium having stored thereon machine-executable instructions for:
receiving a signal;
estimating phase alteration associated with the received signal through employment of a least squares based phase estimation algorithm;
determining an unbiased estimate of noise variance with respect to the received signal based at least in part upon the estimated phase alteration and
calculating from the unbiased estimate of noise variance, a modulation error ratio comprising only interference caused by imperfections of a transmitter.

29. The machine-readable medium of claim 28 having further instructions stored thereon for partitioning the received signal into a plurality of segments, at least one of the segments includes K number of symbols.

30. The machine-readable medium of claim 29 having further instructions stored thereon for determining the unbiased estimate of noise variance with respect to the received signal through employment of the following algorithm:

$$\hat{\sigma}_{zk}^2 = \beta . n=0N-1 r k''(n) - h k2,$$

where $\hat{\phi}_{z_j}$ is the unbiased estimate with respect to a subcarrier k, .beta. is a scaling factor, N is a number of symbols in the received signal, and r".sub.k(n) and h.sub.k are in-phase and quadrature components of noise, respectively.

31. The machine-readable medium of claim 30, wherein .beta.=1 N−0.5−K and the least squares based phase estimation algorithm is a first order algorithm.

32. The machine-readable medium of claim 30, wherein .beta.=1 N−0.5−1.5 K and the least squares based phase estimation algorithm is a second order algorithm.

33. A processor configured to execute the following instructions:
  partitioning a received signal into a plurality of segments, wherein each of the segments includes K symbols;
  determining an estimated phase alteration with respect to each segment of the received signal through utilization of a least squares based phase estimation algorithm;
  determining an estimate of noise variance with respect to the received signal as a function of the estimated phase alteration with respect to each segment of the received signal and
  calculating from the estimate of noise variance, a modulation error ratio comprising only interference caused by imperfections of a transmitter.

34. A FLO receiver that comprises the processor of claim 33.

35. The processor of claim 33, wherein the processor is further configured to execute instructions for determining MER in association with a transmitter that transmits the received signal.

36. The processor of claim 33, wherein the processor is further configured to estimate noise variance through employment of the following algorithm:

$$\sigma\hat{}_{zk}^2 = \beta \cdot \sum_{n=0}^{N-1} r_k''(n) - h_k\hat{}^2,$$

where $\{\widehat{\phi}\}_{z_j}$ is the unbiased estimate with respect to a subcarrier k, .beta. is a scaling factor, N is a number of symbols in the received signal, and r".sub.k(n) and h.sub.k are in-phase and quadrature components of noise, respectively.

37. The processor of claim 36, wherein .beta.=1 N−0.5−K and the least squares based phase estimation algorithm is a first order algorithm.

38. The processor of claim 36, wherein .beta.=1 N−0.5−1.5 K and the least squares based phase estimation algorithm is a second order algorithm.

* * * * *